(12) United States Patent
Schack et al.

(10) Patent No.: US 11,783,400 B1
(45) Date of Patent: Oct. 10, 2023

(54) METHOD, COMPUTER PROGRAM PRODUCT, AND SYSTEM FOR DISPLAYING AUGMENTED REALITY ELEMENTS FOR NAVIGATING TO A LOCATION OF AN ITEM WITHIN A WAREHOUSE

(71) Applicant: Maplebear Inc., San Francisco, CA (US)

(72) Inventors: Spencer Schack, Seattle, WA (US); Andrew Peters, Tiburon, CA (US); Aditya Godbole, San Francisco, CA (US); Dominic Cocchiarella, Berkeley, CA (US); Brandon Leonardo, San Carlos, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 17/877,718

(22) Filed: Jul. 29, 2022

(51) Int. Cl.
*G06Q 30/0601* (2023.01)
*G06T 19/00* (2011.01)
*G06Q 10/087* (2023.01)

(52) U.S. Cl.
CPC ....... *G06Q 30/0631* (2013.01); *G06Q 10/087* (2013.01); *G06Q 30/0633* (2013.01); *G06Q 30/0643* (2013.01); *G06T 19/003* (2013.01); *G06T 19/006* (2013.01)

(58) Field of Classification Search
CPC .......... G06Q 30/0631; G06Q 30/0633; G06Q 30/0643; G06Q 10/087; G06T 19/003; G06T 19/006
USPC .............................................. 705/26.1–27.2
See application file for complete search history.

(56) References Cited

U.S. PATENT DOCUMENTS

| 2014/0280316 A1 | 9/2014 | Ganick et al. |
| 2014/0336814 A1* | 11/2014 | Moore ............... G06Q 10/0875 700/216 |
| 2016/0042315 A1* | 2/2016 | Field-Darragh ..... H04B 5/0062 705/28 |

(Continued)

OTHER PUBLICATIONS

Tiwari, Ajay; Sumit Mehrish. 7 Reasons Why Manufacturers Are Adopting Augmented Reality For Warehouse Picking. Feb. 16, 2022. Published by birlasoft. Accessed via https://www.birlasoft.com/articles/7-reasons-to-use-augmented-reality-for-warehouse-picking (Year: 2022).*

(Continued)

*Primary Examiner* — Allison G Wood
(74) *Attorney, Agent, or Firm* — Fenwick & West LLP

(57) ABSTRACT

A wayfinding application executing on a client device receives a current location of the device within a warehouse and accesses a layout of the warehouse describing locations of items included among an inventory of the warehouse. The application identifies a route from the current location to one or more locations within the warehouse associated with one or more target items, generates augmented reality elements including instructions for navigating the route, and sends the elements to a display area of the device. The application detects a location within the warehouse associated with a target item and determines whether the item is at the location based on an image captured by the device. Upon determining it is not at the location, the application alerts a user of the device to a replacement item by generating an augmented reality element that calls attention to it and sending the element to the display area.

20 Claims, 12 Drawing Sheets

(56) References Cited

U.S. PATENT DOCUMENTS

2018/0088586 A1* 3/2018 Hance .................. G06Q 50/28
2019/0236525 A1* 8/2019 Stanley .................. G06N 3/08

OTHER PUBLICATIONS

PCT International Search Report and Written Opinion, PCT Application No. PCT/US2022/050153, dated Feb. 8, 2023, 17 pages.

* cited by examiner

METHOD, COMPUTER PROGRAM PRODUCT, AND SYSTEM FOR DISPLAYING AUGMENTED REALITY ELEMENTS FOR NAVIGATING TO A LOCATION OF AN ITEM WITHIN A WAREHOUSE

BACKGROUND

This disclosure relates generally to computer hardware and software for displaying augmented reality elements and more specifically to computer hardware and software for displaying augmented reality elements for navigating to a location of an item within a warehouse.

Warehouses, such as grocery stores, discount stores, department stores, and other physical retail stores, generally have layouts that group similar items included among their inventories together, making the items easier to find. For example, in a grocery store, bread, cupcakes, and donuts may be found in an aisle of a bakery department while pet food, leashes, and pet toys may be found in a different aisle for pet supplies. Over time, customers who frequent the same warehouses become familiar with their layouts, allowing them to navigate the warehouses more efficiently when shopping. For example, a customer who has shopped at the same warehouse for several years is likely to be familiar with the layout of the warehouse and may plan an efficient route for collecting items in their shopping list based on their knowledge of the layout, allowing them to navigate directly to the departments and aisles at which the items are located.

However, since the layouts of different warehouses may vary even if the warehouses belong to the same retail chain, customers, as well as shoppers who may be fulfilling orders on behalf of customers using online concierge systems, may not be familiar with the layouts of the warehouses at which they are shopping. For example, a customer or a shopper who is shopping at a grocery store for the first time may visit nearly every department and aisle of the store to search for a few items in a shopping list. In this example, the customer or shopper may need to return to some locations multiple times during the shopping trip and may be unable to find some of the items if they are not looking for them in the correct locations.

Furthermore, even customers or shoppers who are familiar with a layout of a warehouse may have trouble finding replacements for items that are out of stock. Moreover, finding replacements for items may be especially difficult if potential replacements are not located near the items they are replacing. For example, if a grocery store is out of unshelled almonds in a baking aisle, a customer or shopper who has only purchased unshelled almonds in the past may have trouble finding a replacement if they are not aware of potential replacements or their locations within the grocery store (e.g., whole shelled almonds in a snack aisle or slivered almonds in a different aisle near salad dressings).

SUMMARY

Warehouses generally have layouts that group similar items included among their inventories together, making the items easier to find. Over time, customers who frequent the same warehouses become familiar with their layouts, allowing the customers to navigate the warehouses more efficiently when shopping. However, since the layouts of different warehouses may vary, customers, as well as shoppers who may be fulfilling orders on behalf of customers using online concierge systems, may not be familiar with the layouts of the warehouses at which they are shopping. Additionally, customers or shoppers who are familiar with a layout of a warehouse may still have trouble finding replacements for items that are out of stock, especially if potential replacements are not located near the items they are replacing.

To help customers and shoppers navigate warehouses more efficiently and find replacements for items that are out of stock, a wayfinding application executing on a client device displays augmented reality elements for navigating to a location of an item within a warehouse, in accordance with one or more aspects of the disclosure. More specifically, the wayfinding application receives a current location of the client device within the warehouse and accesses a layout of the warehouse describing locations of items included among an inventory of the warehouse. The wayfinding application identifies a route from the current location of the client device to one or more locations within the warehouse associated with one or more target items, generates augmented reality elements including instructions for navigating the route, and sends the augmented reality elements to a display area of the client device. The wayfinding application then detects a location within the warehouse associated with a target item and determines whether the target item is at the location based on an image captured by the client device. Upon determining the target item is not at the location, the wayfinding application alerts a user of the client device to a replacement item by generating an augmented reality element that calls attention to the replacement item and sending the element to the display area of the client device.

The figures depict embodiments of the present disclosure for purposes of illustration only. Alternative embodiments of the structures and methods illustrated herein may be employed without departing from the principles, or benefits touted, of the disclosure described herein.

DETAILED DESCRIPTION

System Architecture

Figure 1:
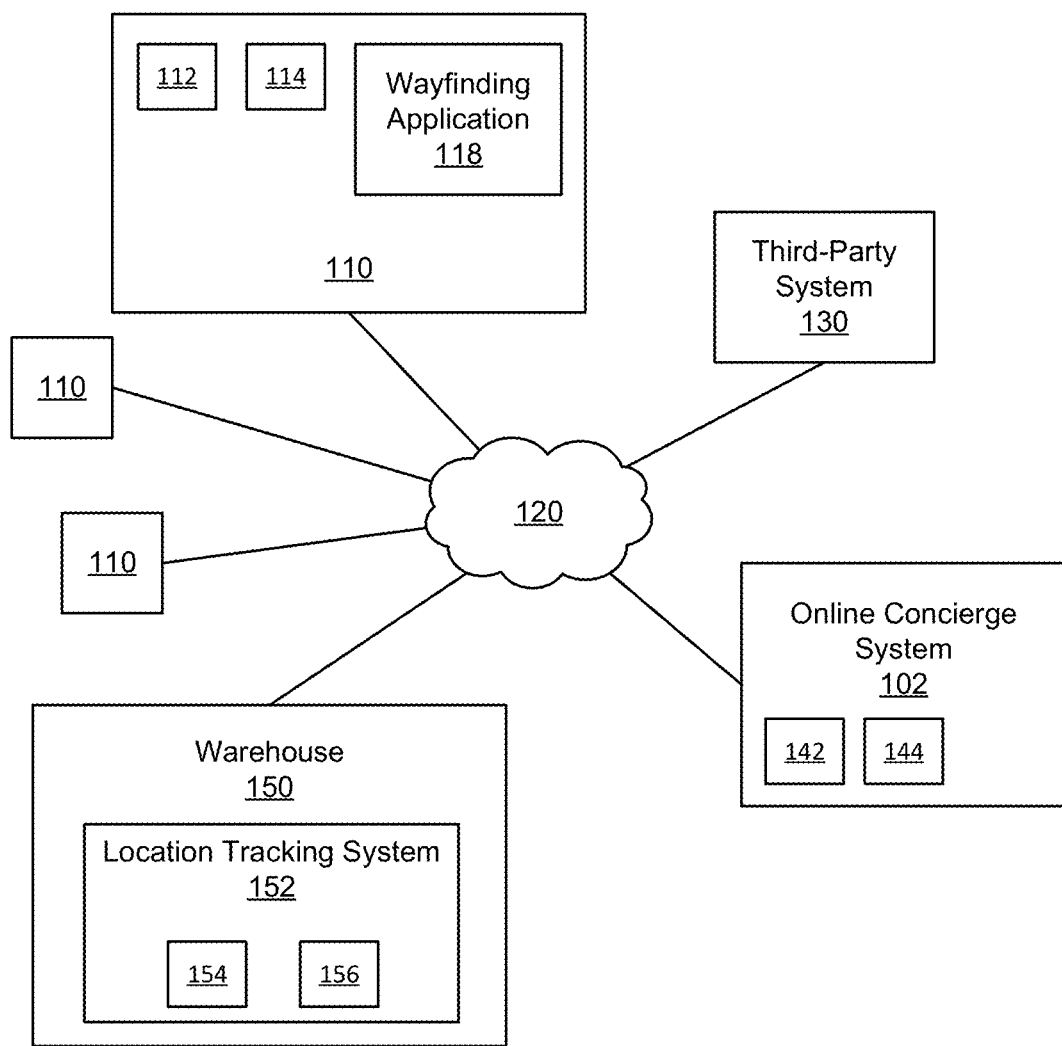
FIG. 1 is a block diagram of a system environment in which an online system, such as an online concierge system, and an application, such as a wayfinding application, operate, according to one or more embodiments.

FIG. 1 is a block diagram of a system environment 100 in which an online system, such as an online concierge system 102 as further described below in conjunction with FIGS. 2 and 3A, and an application, such as a wayfinding application 118 as further described below in conjunction with FIGS. 2 and 3B, operate. The system environment 100 shown in FIG. 1 comprises one or more client devices 110, a network 120, one or more third-party systems 130, the online concierge system 102, and one or more warehouses 150. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, an augmented reality device, or another suitable device. A client device 110 is configured to communicate via the network 120. In one embodiment, a client device 110 executes an application allowing a user of the client device 110 to interact with the online concierge system 102. For example, the client device 110 executes a customer mobile application 206 or a shopper mobile application 212, as further described below in conjunction with FIGS. 4A and 4B, respectively, to enable interaction between the client device 110 and the online concierge system 102. As an additional example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing various functions. In various embodiments, a client device 110 includes a memory 114 comprising a non-transitory storage medium on which instructions are encoded. The memory 114 may have instructions encoded thereon that, when executed by the processor 112, cause the processor 112 to perform functions to execute the customer mobile application 206 or the shopper mobile application 212 to provide the functions further described below in conjunction with FIGS. 4A and 4B, respectively. In some embodiments, the memory 114 also or alternatively may have instructions encoded thereon corresponding to the modules further described below in conjunction with FIG. 3B that, when executed by the processor 112, cause the processor 112 to perform the functionality further described below in conjunction with FIGS. 2 and 5-7E. For example, the memory 114 has instructions encoded thereon that, when executed by the processor 112, cause the processor 112 to display augmented reality elements for navigating to a location of an item within a warehouse 150. In various embodiments, the wayfinding application 118 may be configured to access information associated with a client device 110 and/or components of the client device 110 (e.g., a camera, a display area, etc.). For example, the wayfinding application 118 may access location information (e.g., GPS coordinates) associated with a client device 110 and image or video data captured by a camera of the client device 110. In some embodiments, the wayfinding application 118 may be replaced by an application configured to retrieve content for display to users and to transmit the content to one or more client devices 110 for display.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online concierge system 102 or with the client device(s) 110. In one embodiment, a third-party system 130 is an application provider communicating information describing applications for execution by a client device 110 or communicating data to client devices 110 for use by an application executing on the client device 110. In other embodiments, a third-party system 130 provides content or other information for presentation via a client device 110. For example, a third-party system 130 stores one or more web pages and transmits the web pages to a client device 110 or to the online concierge system 102. A third-party system 130 may also communicate information to the online concierge system 102, such as advertisements, content, or information about an application provided by the third-party system 130.

The online concierge system 102 includes one or more processors 142 configured to control operation of the online concierge system 102 by performing various functions. In various embodiments, the online concierge system 102 includes a memory 144 comprising a non-transitory storage medium on which instructions are encoded. The memory 144 may have instructions encoded thereon corresponding to the modules further described below in conjunction with FIG. 3A that, when executed by the processor 142, cause the processor 142 to perform the functionality further described below in conjunction with FIGS. 2 and 5-7E. For example, the memory 144 has instructions encoded thereon that, when executed by the processor 142, cause the processor 142 to display augmented reality elements for navigating to a location of an item within a warehouse 150. Additionally, the online concierge system 102 includes a communication interface configured to connect the online concierge system 102 to one or more networks, such as network 120, or to otherwise communicate with devices (e.g., client devices 110) connected to the network(s). In various embodiments, the online concierge system 102 may be configured to access information associated with a client device 110 and/or components of the client device 110 (e.g., a camera, a display area, etc.). For example, the online concierge system 102 may access location information (e.g., GPS coordinates) associated with a client device 110 and image or video data captured by a camera of the client device 110.

One or more warehouses 150 may be coupled to the network 120 for communicating various types of information with the online concierge system 102, the client device(s) 110, and/or the third-party system(s) 130. In some embodiments, a warehouse 150 (e.g., a physical grocery store) includes a location tracking system 152 capable of transmitting data to and/or receiving data from the wayfinding application 118 and/or the online concierge system 102 via the network 120. In such embodiments, the location tracking system 152 may include a surveillance system 154 and/or one or more sensors 156 that track(s) the locations of client devices 110 within the warehouse 150. For example, a location tracking system 152 at a warehouse 150 may include one or more sensors 156 that detect client devices 110 scanning for Wi-Fi networks and record MAC addresses associated with any detected client devices 110. In this example, the location tracking system 152 may track the location of a client device 110 (e.g., in various aisles or departments) as it moves throughout the warehouse 150 based on its MAC address and image or video data of a user of the client device 110 captured by one or more cameras included in a surveillance system 154 of the location tracking system 152. Continuing with this example, the location tracking system 152 may transmit data to the wayfinding application 118 and/or the online concierge system 102 describing the location of the client device 110 within the warehouse 150. A location tracking system 152 may transmit data describing a location of a client device 110 within a warehouse 150 to the wayfinding application 118 and/or the online concierge system 102 in association with various types of information (e.g., information identifying the warehouse 150, a time at which the client device 110 was at the location, etc.). In the above example, the location tracking system 152 may transmit the data describing the location of the client device 110 within the warehouse 150 to the wayfinding application 118 and/or the online concierge system 102 in association with a warehouse identifier associated with the warehouse 150 and a timestamp indicating a date and time at which the client device 110 was at the location within the warehouse 150.

One or more of a client device 110, a third-party system 130, a location tracking system 152, or the online concierge system 102 may be special-purpose computing devices configured to perform specific functions, as further described below in conjunction with FIGS. 2-7E, and may include specific computing components such as processors, memories, communication interfaces, and/or the like.

System Overview

Figure 2:
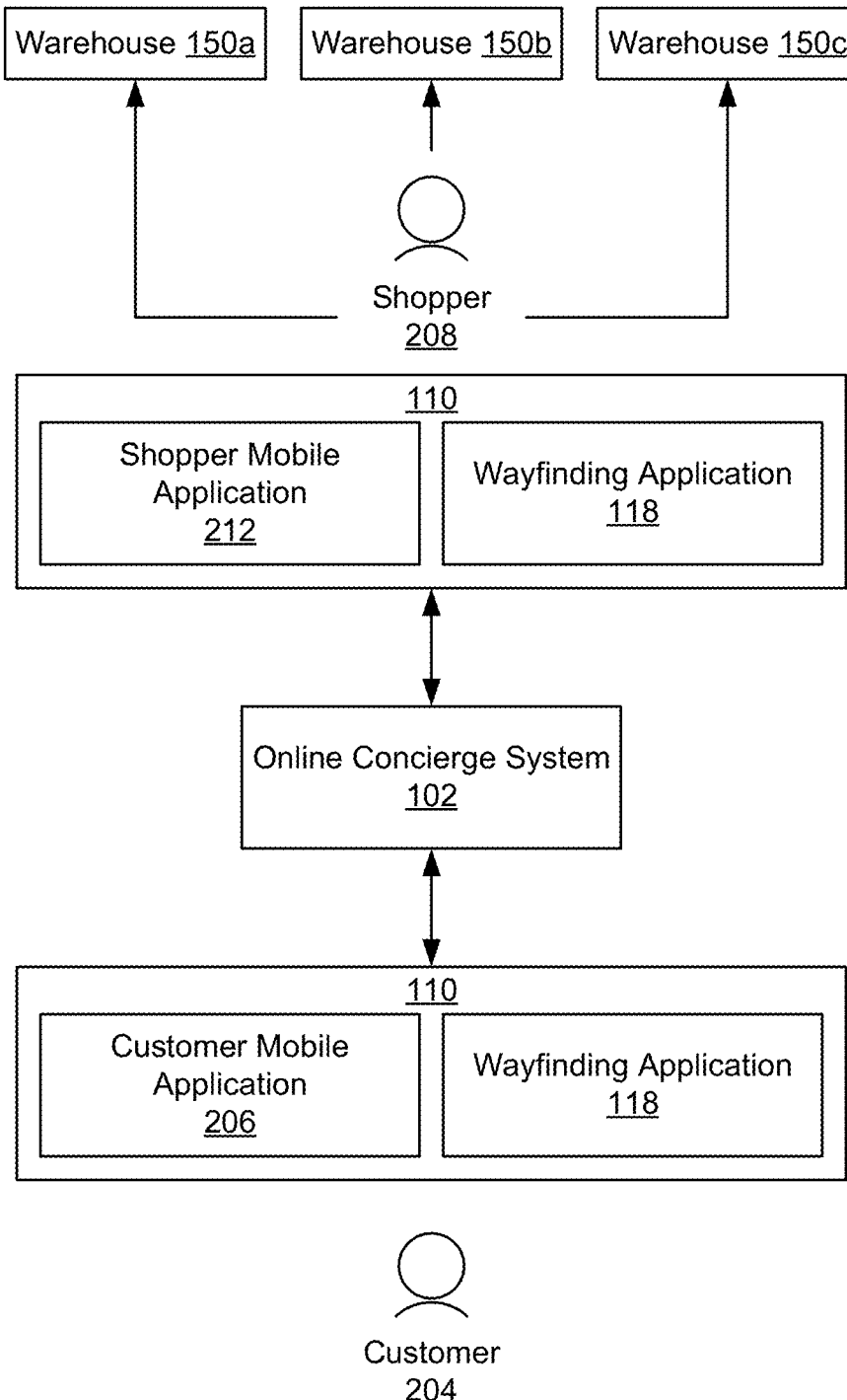
FIG. 2 illustrates an environment of an online concierge system and a wayfinding application, according to one or more embodiments.

FIG. 2 illustrates an environment 200 of an online platform, such as an online concierge system 102, and an application, such as a wayfinding application 118, according to one or more embodiments. The figures use like reference numerals to identify like elements. A letter after a reference numeral, such as "150a," indicates that the text refers specifically to the element having that particular reference numeral. A reference numeral in the text that is not followed by a letter, such as "150," refers to any or all of the elements in the figures bearing that reference numeral. For example, "150" in the text may refer to reference numerals "150a," "150b," and/or "150c" in the figures.

The environment 200 includes an online concierge system 102. The online concierge system 102 is configured to receive orders from one or more customers 204 (only one is shown for the sake of simplicity). An order specifies a list of goods (items or products) to be delivered to a customer 204. An order also specifies a location to which goods are to be delivered, and a time window during which the goods should be delivered. In some embodiments, an order specifies one or more retailers from which goods should be purchased. A customer 204 may use a customer mobile application (CMA) 206, which is configured to communicate with the online concierge system 102, to place an order.

The online concierge system 102 is configured to transmit orders received from customers 204 to one or more shoppers 208. A shopper 208 may be a person (e.g., a contractor, an employee, etc.), an entity, or an autonomous device (e.g., a robot) enabled to fulfill orders received by the online concierge system 102. A shopper 208 travels between a warehouse 150 and a delivery location (e.g., a customer's home or office) and may do so by car, truck, bicycle, scooter, foot, or via any other mode of transportation. In some embodiments, a delivery may be partially or fully automated, e.g., using a self-driving car. The environment 200 also includes three warehouses 150a, 150b, and 150c (while only three are shown for the sake of simplicity, the environment 200 may include hundreds of warehouses 150). The warehouses 150 may be physical retailers, such as grocery stores, discount stores, department stores, etc., or non-public warehouses 150 storing items that may be collected and delivered to customers 204. Each shopper 208 fulfills an order received from the online concierge system 102 at one or more warehouses 150, delivers the order to a customer 204, or performs both fulfillment and delivery. In one embodiment, shoppers 208 make use of a shopper mobile application 212 which is configured to interact with the online concierge system 102.

As described above, the wayfinding application 118 is configured to display augmented reality elements for navigating to a location of an item within a warehouse 150. The wayfinding application 118 may be executed on a client device 110 associated with a shopper 208 fulfilling an order on behalf of a customer 204. Alternatively, the wayfinding application 118 may be executed on a client device 110 associated with a customer 204 of a retailer associated with a warehouse 150, in which the customer 204 may or may not be associated with the online concierge system 102. For example, the wayfinding application 118 may be executed on a client device 110 associated with a customer 204 of a retailer associated with a warehouse 150, in which the customer 204 is doing their own shopping at the warehouse 150 and may or may not be associated with the online concierge system 102. In various embodiments, the wayfinding application 118 may interact with the online concierge system 102, the CMA 206, and/or the SMA 212, while in other embodiments, the wayfinding application 118 is a standalone application. In some embodiments, the online concierge system 102 is configured to perform some or all of the functionality described below in conjunction with FIG. 3A, while in other embodiments, the wayfinding application 118 is configured to perform some or all of the functionality described below in conjunction with FIG. 3B.

Figure 3A:
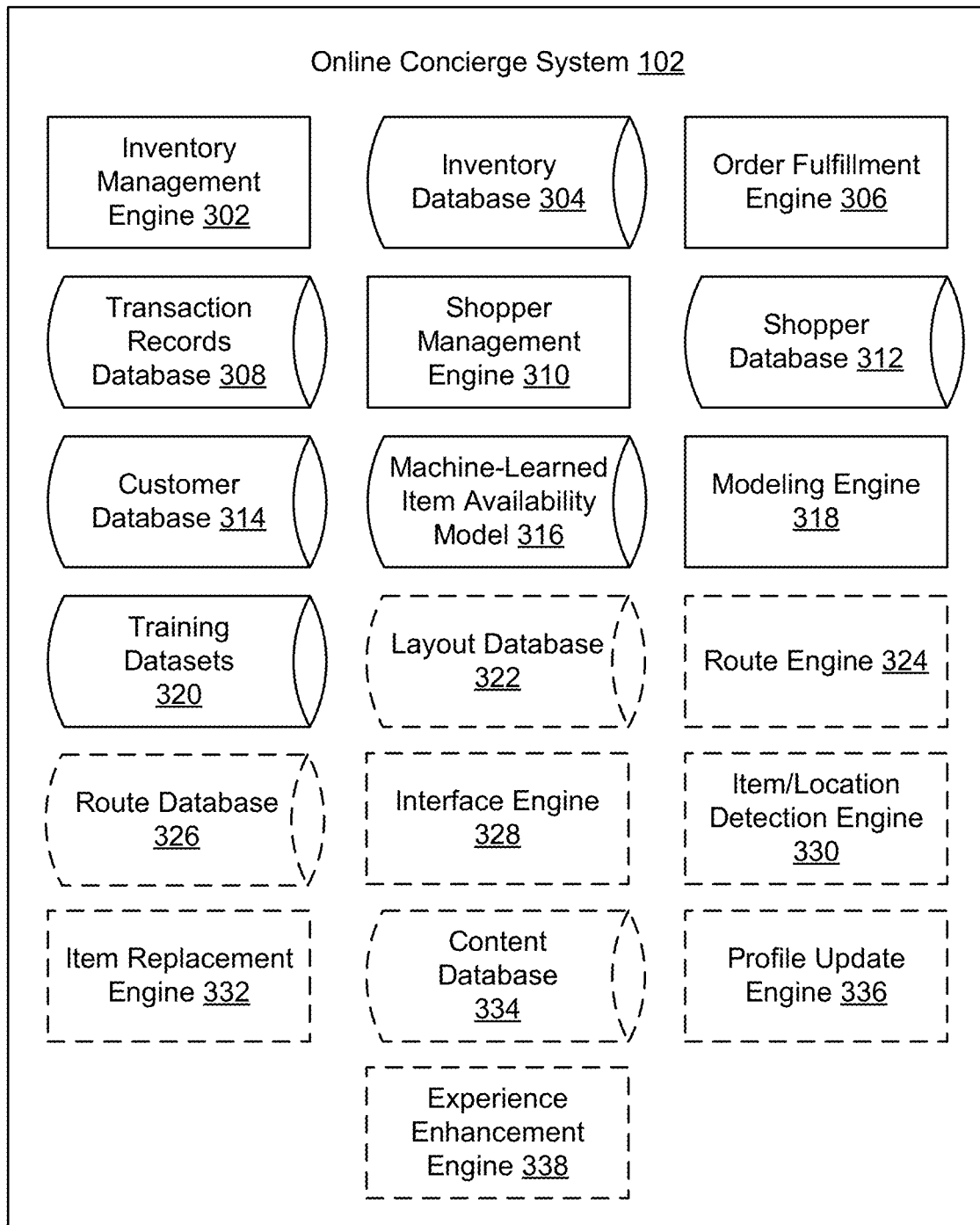
FIG. 3A is a diagram of an online concierge system, according to one or more embodiments.

FIG. 3A is a diagram of an online concierge system 102, according to one or more embodiments. In various embodiments, the online concierge system 102 may include different or additional modules than those described in conjunction with FIG. 3A. Furthermore, in some embodiments, the online concierge system 102 includes fewer modules than those described in conjunction with FIG. 3A.

The online concierge system 102 includes an inventory management engine 302, which interacts with inventory systems associated with each warehouse 150. In one embodiment, the inventory management engine 302 requests and receives inventory information maintained by a warehouse 150. The inventory of each warehouse 150 is unique and may change over time. The inventory management engine 302 monitors changes in inventory for each participating warehouse 150. The inventory management engine 302 is also configured to store inventory records in an inventory database 304. The inventory database 304 may store information in separate records—one for each participating warehouse 150—or may consolidate or combine inventory information into a unified record. Inventory information includes attributes of items that include both qualitative and quantitative information about the items, including size, color, weight, SKU, serial number, etc. In some embodiments, the inventory management engine 302 may update the inventory of a warehouse 150 based on information received from the item/location detection engine 330 (described below) describing a quantity of an item detected within the warehouse 150. For example, if information stored in the inventory database 304 indicates that an item is out of stock at a warehouse 150, but the item/location detection engine 330 detects three of the item at the warehouse 150, the inventory management engine 302 may update the inventory database 304 to reflect this. In one embodiment, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse 150), the inventory database 304 may store a time that the item was last found, a time that the item was last not found (e.g., if a shopper 208 looked for the item but could not find it), a rate at which the item is found, and a popularity of the item. In some embodiments, the inventory management engine 302 receives an item catalog from a warehouse 150 identifying items offered for purchase by the warehouse 150. In such embodiments, one or more images of each item included in the item catalog may be stored in the inventory database 304 in association with various types of information (e.g., information identifying the item and the warehouse 150, a date the catalog was received, etc.).

For each item, the inventory database 304 identifies one or more attributes of the item and corresponding values for each attribute of the item. For example, the inventory database 304 includes an entry for each item offered by a warehouse 150, in which an entry for an item includes an item identifier that uniquely identifies the item. The entry includes different fields, with each field corresponding to an attribute of the item. A field of an entry includes a value for an attribute corresponding to the field, allowing the inventory database 304 to maintain values of different attributes for various items.

In various embodiments, the inventory management engine 302 maintains a taxonomy of items offered for purchase by one or more warehouses 150. For example, the inventory management engine 302 receives an item catalog from a warehouse 150 identifying items offered for purchase by the warehouse 150. From the item catalog, the inventory management engine 302 determines a taxonomy of items offered by the warehouse 150, in which different levels of the taxonomy provide different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.) with the category. Thus, the taxonomy maintains associations between a category and specific items offered by the warehouse 150 matching the category. In some embodiments, different levels of the taxonomy identify items with differing levels of specificity based on any suitable attribute or combination of attributes of the items. For example, different levels of the taxonomy specify different combinations of attributes of items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels of the taxonomy include fewer details about items, so greater numbers of items are included in higher levels (e.g., higher levels include a greater number of items satisfying a broader category). Similarly, lower levels of the taxonomy include greater details about items, so fewer numbers of items are included in the lower levels (e.g., lower levels include a fewer number of items satisfying a more specific category). The taxonomy may be received from a warehouse 150 in various embodiments. In other embodiments, the inventory management engine 302 applies a trained classification model to an item catalog received from a warehouse 150 to include different items in levels of the taxonomy, so application of the trained classification model associates specific items with categories corresponding to levels within the taxonomy.

Inventory information provided by the inventory management engine 302 may supplement training datasets 320. Inventory information provided by the inventory management engine 302 may not necessarily include information about the outcome of fulfilling a delivery order associated with the item, whereas the data within the training datasets 320 is structured to include an outcome of fulfilling a delivery order (e.g., if an item in an order was or was not collected).

The online concierge system 102 also includes an order fulfillment engine 306 which is configured to synthesize and display an ordering interface to each customer 204 (for example, via the customer mobile application 206). The order fulfillment engine 306 is also configured to access the inventory database 304 in order to determine which items are available at which warehouse 150. The order fulfillment engine 306 may supplement the item availability information from the inventory database 304 with item availability information predicted by a machine-learned item availability model 316. The order fulfillment engine 306 determines a sale price for each item ordered by a customer 204. Prices set by the order fulfillment engine 306 may or may not be identical to in-store prices determined by retailers (which is the price that customers 204 and shoppers 208 would pay at the retail warehouses 150). The order fulfillment engine 306 also facilitates transactions associated with each order. In one embodiment, the order fulfillment engine 306 charges a payment instrument associated with a customer 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device 110 of a customer 204 for display via the customer mobile application 206. The order fulfillment engine 306 receives a query comprising one or more terms from a customer 204 and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 150. For example, after successful fulfillment of an order, the order fulfillment engine 306 may transmit a summary of the order to the appropriate warehouses 150. Details of an order may indicate the items purchased, a total value of the items, and in some cases, an identity of a shopper 208 and a customer 204 associated with the order. In one embodiment, the order fulfillment engine 306 pushes transaction and/or order details asynchronously to retailer systems. This may be accomplished via the use of webhooks, which enable programmatic or system-driven transmission of information between web applications. In another embodiment, retailer systems may be configured to periodically poll the order fulfillment engine 306, which provides details of all orders which have been processed since the last request.

The order fulfillment engine 306 may interact with a shopper management engine 310, which manages communication with and utilization of shoppers 208. In one embodiment, the shopper management engine 310 receives a new order from the order fulfillment engine 306. The shopper management engine 310 identifies the appropriate warehouse 150 to fulfill the order based on one or more parameters, such as a probability of item availability determined by the machine-learned item availability model 316, the contents of the order, the inventory of the warehouses 150, and the proximity of the warehouses 150 to the delivery location. The shopper management engine 310 then identifies one or more appropriate shoppers 208 to fulfill the order based on one or more parameters, such as the shoppers' proximity to the appropriate warehouse 150 (and/or to the customer 204), his/her familiarity level with that particular warehouse 150, etc. Additionally, the shopper management engine 310 accesses a shopper database 312 which stores information describing each shopper 208, such as his/her name, gender, rating, previous shopping history, etc.

As part of fulfilling an order, the order fulfillment engine 306 and/or shopper management engine 310 may access a customer database 314, which stores profile information associated with each customer 204. In some embodiments, the customer database 314 may store profile information associated with each customer 204 who is a user of the online concierge system 102 (e.g., a customer 204 who has placed an order to be fulfilled by a shopper 208). In various embodiments, the customer database 314 also or alternatively may store profile information associated with each customer 204 of one or more retailers associated with one or more warehouses 150, in which a customer 204 may or may not be associated with the online concierge system 102 (e.g., a customer 204 of a retailer associated with a warehouse 150 who is doing their own shopping at the warehouse 150). Profile information stored in the customer database 314 may include each customer's name, address, gender, preferences, favorite items, stored payment instruments, order history, etc. In some embodiments, profile information associated with a customer 204 may describe one or more preferences of the customer 204 for items having various attributes. Preferences for items may describe types, qualities, quantities, colors, sizes, brands, manufacturing locations, ingredients, packaging, or any other attributes of items. For example, the customer database 314 may store information describing a preference of a customer 204 for certain types of milk (e.g., oat and soy). As an additional example, the customer database 314 may store information describing a preference of a customer 204 for a particular brand of coffee creamer and a minimum number of days between an expiration date and a current date for dairy items.

In some embodiments, preferences stored in the customer database 314 also may include a customer's dislike for items having various attributes and/or a set of restrictions associated with the customer 204. For example, if a customer 204 is allergic to peanuts, preferences included among the customer's profile information may indicate that the customer 204 has a dietary restriction related to peanuts and is therefore unlikely to be interested in food items including peanuts as an ingredient. As an additional example, if a customer 204 previously reported a problem with a delivery order, in which organic blueberries requested by the customer 204 were unavailable and were replaced with non-organic blueberries and the customer 204 indicated that the replacement item was a poor replacement, preferences included among the customer's profile information may indicate that the customer 204 dislikes non-organic blueberries.

Profile information associated with a customer 204 stored in the customer database 314 may include the customer's order and/or purchase history and/or one or more lists of items (e.g., shopping lists) associated with the customer 204. Information describing an order/purchase included in a customer's order/purchase history may include a date and time of the order/purchase, information describing items included in the order/purchase, a price of each item included in the order/purchase, a total cost of the order/purchase, a warehouse 150 at which the order/purchase was fulfilled/completed, coupons, discounts, or other promotions applied to the order/purchase, or any other information that may be associated with an order/purchase. In embodiments in which the customer database 314 includes one or more lists of items associated with a customer 204, each list may include one or more items specified by the customer 204. Each list of items associated with a customer 204 may be created by the customer 204 using an interface generated and transmitted by the interface engine 328, as described below. Similar to each order/purchase included in an order/purchase history, information describing a list of items may include a date the list was created, information describing items included in the list, information identifying a warehouse 150 at which items on the list were collected, or any other suitable types of information that may be associated with a list of items.

In various embodiments, profile information stored in the customer database 314 also may include one or more goals associated with a customer 204. A goal associated with a customer 204 may describe the customer's personal goals (e.g., health goals, nutritional goals, etc.). For example, profile information stored in the customer database 314 may describe goals of a customer 204 to lose weight, increase protein intake, and eat fewer processed foods. As an additional example, profile information associated with a customer 204 may describe a goal of saving money on groceries.

In some embodiments, profile information stored in the customer database 314 also may include information received from the interface engine 328 (described below) describing augmented reality elements sent to display areas of client devices 110 associated with customers 204. In such embodiments, the customers 204 may be users of the client devices 110 or may have placed orders fulfilled by shoppers 208 who were using the client devices 110 when the augmented reality elements were sent. Information describing an augmented reality element sent to a display area of a client device 110 associated with a customer 204 may describe a function of the augmented reality element (e.g., to call attention to an item, to promote an item, to compare items, etc.) and identify one or more items or other physical elements to which the augmented reality element was directed. The information also may identify one or more content items included in the augmented reality element (e.g., a coupon, a recipe, a video, etc.) and a date and time that the augmented reality element was sent to the display area of the client device 110.

In various embodiments, the order fulfillment engine 306 determines whether to delay display of a received order to shoppers 208 for fulfillment by a time interval. In response to determining to delay display of the received order by a time interval, the order fulfillment engine 306 evaluates subsequent orders received during the time interval for inclusion in one or more batches that also include the received order. After the time interval, the order fulfillment engine 306 displays the order to one or more shoppers 208 via the shopper mobile application 212; if the order fulfillment engine 306 generated one or more batches including the received order and one or more subsequent orders received during the time interval, the batch(es) is/are also displayed to one or more shoppers 208 via the shopper mobile application 212.

Machine Learning Models

The online concierge system 102 further includes the machine-learned item availability model 316, a modeling engine 318, and the training datasets 320. The modeling engine 318 uses the training datasets 320 to generate the machine-learned item availability model 316. The machine-learned item availability model 316 may learn from the training datasets 320, rather than follow only explicitly programmed instructions. The inventory management engine 302, order fulfillment engine 306, and/or shopper management engine 310 may use the machine-learned item availability model 316 to determine a probability that an item is available at a warehouse 150. The machine-learned item availability model 316 may be used to predict item availability for items being displayed to or selected by a customer 204 or included in received delivery orders. A single machine-learned item availability model 316 is used to predict the availability of any number of items.

The machine-learned item availability model 316 may be configured to receive, as inputs, information about an item, a warehouse 150 for collecting the item, and a time for collecting the item. The machine-learned item availability model 316 may be adapted to receive any information that the modeling engine 318 identifies as an indicator of item availability. At a minimum, the machine-learned item availability model 316 receives information about an item-warehouse pair, such as an item in a delivery order and a warehouse 150 at which the order may be fulfilled. Items stored in the inventory database 304 may be identified by item identifiers. As described above, various characteristics, some of which are specific to a warehouse 150 (e.g., a time that an item was last found in the warehouse 150, a time that the item was last not found in the warehouse 150, a rate at which the item is found, a popularity of the item, etc.) may be stored for each item in the inventory database 304. Similarly, each warehouse 150 may be identified by a warehouse identifier and stored in a warehouse database along with information about the warehouse 150. A particular item at a particular warehouse 150 may be identified using an item identifier and a warehouse identifier. In other embodiments, the item identifier refers to a particular item at a particular warehouse 150, so that the same item at two different warehouses 150 is associated with two different identifiers. For convenience, both of these options to identify an item at a warehouse 150 are referred to herein as an "item-warehouse pair." Based on the identifier(s), the online concierge system 102 may extract information about the item and/or warehouse 150 from the inventory database 304 and/or warehouse database and provide this extracted information as inputs to the machine-learned item availability model 316.

The machine-learned item availability model 316 contains a set of functions generated by the modeling engine 318 from the training datasets 320 that relate an item, a warehouse 150, timing information, and/or any other relevant inputs, to a probability that the item is available at the warehouse 150. Thus, for a given item-warehouse pair, the machine-learned item availability model 316 outputs a probability that the item is available at the warehouse 150. The machine-learned item availability model 316 constructs a relationship between the item-warehouse pair, the timing information, and/or any other inputs and the probability of availability (also referred to as "availability") that is generic enough to apply to any number of different item-warehouse pairs. In some embodiments, the probability output by the machine-learned item availability model 316 includes a confidence score. The confidence score may be the error or uncertainty score of the probability of availability and may be calculated using any standard statistical error measurement. In some embodiments, the confidence score is based in part on whether the item-warehouse pair availability prediction was accurate for previous delivery orders (e.g., if an item was predicted to be available at a warehouse 150 and was not found by a shopper 208 or was predicted to be unavailable but was found by the shopper 208). In various embodiments, the confidence score is based in part on the age of the data for the item (e.g., if availability information has been received within the past hour or the past day). The set of functions of the machine-learned item availability model 316 may be updated and adapted following retraining with new training datasets 320. The machine-learned item availability model 316 may be any machine learning model, such as a neural network, a boosted tree, a gradient-boosted tree, or a random forest model. In some embodiments, the machine-learned item availability model 316 is generated from the XGBoost algorithm. The probability of availability of an item generated by the machine-learned item availability model 316 may be used to determine instructions delivered to a customer 204 and/or shopper 208, as described in further detail below.

The training datasets 320 relate a variety of different factors to known item availabilities from the outcomes of previous delivery orders (e.g., if an item was previously found or previously unavailable). The training datasets 320 include items included in previous delivery orders, whether the items in the previous delivery orders were collected, warehouses 150 associated with the previous delivery orders, and a variety of characteristics associated with each of the items, which may be obtained from the inventory database 304. Each piece of data in the training datasets 320 includes an outcome of a previous delivery order (e.g., whether an item was collected). Item characteristics may be determined by the machine-learned item availability model 316 to be statistically significant factors predictive of an item's availability. Item characteristics that are predictors of availability may be different for different items. For example, an item type factor might be the best predictor of availability for dairy items, whereas a time of day may be the best predictive factor of availability for vegetables. For each item, the machine-learned item availability model 316 may weight these factors differently, in which the weights are a result of a "learning" or a training process on the training datasets 320. The training datasets 320 are very large datasets taken across a wide cross section of warehouses 150, shoppers 208, items, delivery orders, times, and item characteristics. The training datasets 320 are large enough to provide a mapping from an item in an order to a probability that the item is available at a warehouse 150. In addition to previous delivery orders, the training datasets 320 may be supplemented by inventory information provided by the inventory management engine 302. In some embodiments, the training datasets 320 are historical delivery order information used to train the machine-learned item availability model 316, whereas the inventory information stored in the inventory database 304 includes factors input into the machine-learned item availability model 316 to determine an item availability for an item in a newly received delivery order. In various embodiments, the modeling engine 318 may evaluate the training datasets 320 to compare a single item's availability across multiple warehouses 150 to determine if an item is chronically unavailable, which may indicate that the item is no longer manufactured. The modeling engine 318 may query a warehouse 150 through the inventory management engine 302 for updated item information about any such items.

Machine Learning Factors

The training datasets 320 include times associated with previous delivery orders. In some embodiments, the training datasets 320 include a time of day at which each previous delivery order was placed. Item availability may be impacted by time of day since items that are otherwise regularly stocked by warehouses 150 may become unavailable during high-volume shopping times. In addition, item availability may be affected by restocking schedules. For example, if a warehouse 150 mainly restocks items at night, item availability at the warehouse 150 will tend to decrease over the course of the day. Additionally, or alternatively, the training datasets 320 include a day of the week that previous delivery orders were placed. The day of the week may impact item availability since warehouses 150 may have reduced item inventory on popular shopping days and restocking shipments may be received on particular days. In some embodiments, the training datasets 320 include a time interval since an item was previously collected for a previous delivery order. If an item has recently been collected at a warehouse 150, this may increase the probability that it is still available. If a long interval of time has elapsed since an item has been collected, this may indicate that the probability that the item is available for subsequent orders is low or uncertain. In some embodiments, the training datasets 320 include a time interval since an item in a previous delivery order was not found. If a short interval of time has elapsed since an item was not found, this may indicate that there is a low probability that the item will be available for subsequent delivery orders. Conversely, if a long interval of time has elapsed since an item was not found, this may indicate that the item may have been restocked and will be available for subsequent delivery orders. In some embodiments, the training datasets 320 may also include a rate at which an item is typically found by a shopper 208 at a warehouse 150, a number of days since inventory information about the item was last received from the inventory management engine 302, a number of times the item was not found during a previous week, or any number of additional rate-related or time-related information. Relationships between this rate-related and/or time-related information and item availability are determined by the modeling engine 318, which trains a machine learning model with the training datasets 320, producing the machine-learned item availability model 316.

The training datasets 320 include item characteristics. In some embodiments, the item characteristics include a department associated with an item. For example, if an item is yogurt, it is associated with a dairy department. Examples of departments include bakery, beverage, nonfood, pharmacy, produce, floral, deli, prepared foods, meat, seafood, dairy, or any other categorization of items used by a warehouse 150. A department associated with an item may affect item availability since different departments have different item turnover rates and inventory levels. In some embodiments, the item characteristics include an aisle of a warehouse 150 associated with an item. The aisle of the warehouse 150 may affect item availability since different aisles of a warehouse 150 may be restocked more frequently than others. Additionally, or alternatively, the item characteristics may include an item popularity score. The item popularity score for an item may be proportional to the number of delivery orders received that include the item. An alternative or additional item popularity score may be provided by a retailer through the inventory management engine 302. In some embodiments, the item characteristics include a product type associated with an item. For example, if an item is a particular brand of a product, the product type will be a generic description of the product type, such as "milk" or "eggs." The product type may affect item availability since certain product types may have higher turnover and restocking rates than others or may have larger inventories in the warehouses 150. In some embodiments, the item characteristics may include a number of times a shopper 208 was instructed to keep looking for an item after he or she was initially unable to find the item, a total number of delivery orders received for an item, whether or not an item is organic, vegan, gluten free, or any other characteristics associated with an item. The relationships between item characteristics and item availability are determined by the modeling engine 318, which trains a machine learning model with the training datasets 320, producing the machine-learned item availability model 316.

The training datasets 320 may include additional item characteristics that affect item availability and may therefore be used to build the machine-learned item availability model 316 relating a delivery order including an item to the item's predicted availability. The training datasets 320 may be periodically updated with recent delivery orders. The training datasets 320 may be updated with item availability information provided directly from shoppers 208. Following updating of the training datasets 320, the modeling engine 318 may retrain a model with the updated training datasets 320 and produce a new machine-learned item availability model 316.

Navigation Components

In some embodiments, the online concierge system 102 further includes a layout database 322. The layout database 322 stores one or more layouts of one or more warehouses 150. In some embodiments, a layout of a warehouse 150 may be received from a retailer associated with the warehouse 150 and updated by the retailer or the item/location detection engine 330, as described below. A layout of a warehouse 150 may be stored in the layout database 322 in association with information that uniquely identifies the warehouse 150, such as a name of the warehouse 150, a geographic location of the warehouse 150, etc. For example, a layout of a warehouse 150 may be stored in association with GPS coordinates associated with the warehouse 150, a combination of a name of a retailer associated with the warehouse 150 and a city and state in which the warehouse 150 is located, etc.

A layout of a warehouse 150 may describe departments and/or physical elements within the warehouse 150, such as organizational elements, including aisles, shelves within the aisles, various display areas (e.g., frozen or refrigerated display cases, display tables, and sample and promotional displays), etc., as well as their arrangement within the warehouse 150. In addition to organizational elements, a layout of a warehouse 150 also may describe additional physical elements within the warehouse 150, such as items included among an inventory of the warehouse 150, service counters (e.g., for various departments and/or checkout counters), and various building elements (e.g. entrances/exits, floors, ceilings, walls, stairs, elevators, etc.), and their arrangement within the warehouse 150. A layout of a warehouse 150 also may include one or more images of departments and physical elements within the warehouse 150 captured from one or more angles, positions, etc. In some embodiments, a layout of a warehouse 150 also may describe dimensions associated with the warehouse 150 (e.g., dimensions associated with departments and/or organizational elements within the warehouse 150). For example, a layout of a warehouse 150 may describe lengths of various aisles, distances between the aisles, heights of shelves, etc. Furthermore, in various embodiments, a layout of a warehouse 150 may describe congestion/traffic within the warehouse 150. For example, a layout of a warehouse 150 may describe certain times or days of the week when particular service counters or aisles with sample displays are more congested than others.

Additionally, a layout of a warehouse 150 may describe a set of locations within the warehouse 150 associated with each item included among its inventory. A location within a warehouse 150 associated with an item may correspond to a particular area within the warehouse 150 at which the item may be collected. For example, a layout of a warehouse 150 may describe one or more locations within the warehouse 150 associated with an item, in which each location corresponds to a particular aisle, a particular shelf, a particular display table, a particular promotional display, etc., at which the item may be collected.

In some embodiments, the online concierge system 102 further includes a route engine 324. The route engine 324 may access a layout of a warehouse 150 from the layout database 322 and identify a route for navigating from a location of a client device 110 within the warehouse 150 to one or more locations within the warehouse 150 associated with one or more items included among an inventory of the warehouse 150 to be collected during a shopping trip (e.g., items included in an order or a shopping list). The route engine 324 may do so based on the location of the client device 110 within the warehouse 150, information identifying the item(s), and the layout of the warehouse 150. For example, if a client device 110 is at a location within a warehouse 150 corresponding to an entrance/exit of the warehouse 150, based on a layout of the warehouse 150, the route engine 324 may identify a route for navigating from the entrance/exit to locations of items within the warehouse 150, in which the items are included in a shopping list. In this example, the route may indicate an order in which the items are to be collected and locations along the route (e.g., specific shelves or locations within specific display cases) at which the items are located. In embodiments in which the layout database 322 maintains layouts of multiple warehouses 150, a layout of a warehouse 150 accessed by the route engine 324 may be identified based on information identifying the warehouse 150 received by the route engine 324, as further described below.

The route engine 324 may receive a location of a client device 110 within a warehouse 150 in various ways. In some embodiments, the route engine 324 may receive a location of a client device 110 within a warehouse 150 from a location tracking system 152 at the warehouse 150. For example, a location tracking system 152 at a warehouse 150 may include one or more sensors 156 that detect client devices 110 scanning for Wi-Fi networks and record MAC addresses associated with any detected client devices 110. In this example, the location tracking system 152 may track the location of a client device 110 (e.g., in various aisles or departments) as it moves throughout the warehouse 150 based on its MAC address and image or video data of a user of the client device 110 captured by one or more cameras included in a surveillance system 154 of the location tracking system 152. Continuing with this example, the route engine 324 may receive the location of the client device 110 within the warehouse 150 from the location tracking system 152. In some embodiments, the route engine 324 also or alternatively may receive other types of information from a location tracking system 152 at a warehouse 150 (e.g., information identifying the warehouse 150, a time at which a client device 110 was at the warehouse 150 or at a specific location within the warehouse 150, etc.). In the above example, the route engine 324 may receive the location of the client device 110 within the warehouse 150 in association with a warehouse identifier associated with the warehouse 150 and a timestamp indicating a date and time at which the client device 110 was at the location within the warehouse 150. In various embodiments, the route engine 324 also or alternatively may receive a location of a client device 110 within a warehouse 150 from the item/location detection engine 330. In such embodiments, the item/location detection engine 330 may detect the location of the client device 110 within the warehouse 150 based on a layout of the warehouse 150 and image or video data including a display area of the client device 110 received by the interface engine 328, as further described below.

The route engine 324 also may receive information identifying a warehouse 150 and/or information identifying one or more items included among an inventory of the warehouse 150 to be collected during a shopping trip (e.g., one or more items included in an order or a shopping list). In some embodiments, the route engine 324 may receive information identifying a warehouse 150 from a location tracking system 152 at the warehouse 150, as described above. The route engine 324 also or alternatively may receive information identifying a warehouse 150 from a client device 110 via GPS triangulation, cell tower triangulation, Wi-Fi positioning, or any other suitable technique. For example, if a client device 110 is at a warehouse 150, the route engine 324 may track a location of the client device 110 (e.g., via GPS triangulation), access information describing the locations of various warehouses 150 (e.g., stored in the layout database 322 or a warehouse database), and identify the warehouse 150 based on the location of the client device 110. The route engine 324 also or alternatively may receive information identifying a warehouse 150 and/or information identifying one or more items included among an inventory of the warehouse 150 to be collected during a shopping trip via an interface generated and transmitted by the interface engine 328, as further described below. In embodiments in which a shopper 208 is fulfilling an order on behalf of a customer 204, the route engine 324 may receive information identifying one or more items included in the order and/or information identifying a warehouse 150 from one or more components of the online concierge system 102. For example, the route engine 324 may receive information identifying one or more items included in an order from the order fulfillment engine 306 and information identifying a warehouse 150 at which the order is to be fulfilled from the shopper management engine 310.

The route engine 324 may identify a route using various techniques. In some embodiments, the route engine 324 may identify a route based on a distance from a location of a client device 110 within a warehouse 150 to one or more locations within the warehouse 150 associated with one or more items included among the inventory of the warehouse 150 to be collected during a shopping trip. For example, the route engine 324 may identify a route that requires a user of a client device 110 to travel a minimum distance to collect items included in a shopping list. In various embodiments, the route engine 324 also or alternatively may identify a route based on a predicted amount of time required to travel from a location of a client device 110 within a warehouse 150 to one or more locations within the warehouse 150 associated with one or more items included among the inventory of the warehouse 150 to be collected during a shopping trip. For example, based on information describing congestion/traffic within a warehouse 150 during different times of the day described in a layout of the warehouse 150, the route engine 324 may identify a route that is predicted to take a user of a client device 110 a shortest amount of time to travel to collect items included in a shopping list.

In some embodiments, the route engine 324 also may identify a route using a machine-learned model. For example, the route engine 324 may identify a route using a machine-learned model that is trained based on information describing routes and other information associated with the routes (e.g., stored in the route database 326, described below). In this example, the route engine 324 may provide an input to the machine-learned model including a location of a client device 110 within a warehouse 150, information identifying one or more items to be collected during a shopping trip, and a layout of the warehouse 150. Continuing with this example, the route engine 324 may receive an output from the model identifying a route that requires a user of the client device 110 to travel a minimum distance to collect the item(s) and/or a route that is predicted to take the user a shortest amount of time to collect the item(s).

In various embodiments, the route engine 324 also may modify a route based on a location within a warehouse 150 associated with a replacement item. For example, suppose that a user of a client device 110 has followed a route identified by the route engine 324 and is at a location within a warehouse 150 associated with an item included in a shopping list and the item is out of stock. In this example, once a replacement item is identified (e.g., by a customer 204 or by the item replacement engine 332 and/or the experience enhancement engine 338, described below), the route engine 324 may identify a location within the warehouse 150 associated with the replacement item based on a layout of the warehouse 150. In the above example, the route engine 324 may modify the route such that the modified route is for navigating from the location associated with the item to the location associated with the replacement item and the locations associated with any remaining items in the shopping list.

In some embodiments, the route engine 324 also may modify a route identified by the route engine 324 if a user of a client device 110 deviates from the route. In such embodiments, the route engine 324 may modify the route based on a current location of the client device 110 within the warehouse 150. For example, if a user of a client device 110 deviates from a route identified by the route engine 324 after collecting some items included in a shopping list, the route engine 324 may receive information from the item/location detection engine 330 (described below) indicating the user has deviated from the route and a current location of the client device 110 within a warehouse 150. In this example, the route engine 324 may modify the route based on the current location of the client device 110 within the warehouse 150 and the locations associated with the remaining items in the shopping list, such that the items may be collected in an order that is different from that associated with the original route. In embodiments in which the route engine 324 modifies a route, the route engine 324 may do so using the same techniques described above for identifying a route.

In various embodiments, the route engine 324 may be configured to store information describing routes (i.e., routes identified or modified by the route engine 324) in a route database 326. Information describing a route may be stored in the route database 326 in association with various types of information. Information describing a route may be stored in association with information describing a client device 110 associated with the route (e.g., an IP address associated with the client device 110), a user associated with the client device 110 (e.g., a username, email address, or other identifier associated with the user), and/or a warehouse 150 associated with the route (e.g., a warehouse identifier). Information describing a route also or alternatively may be stored in association with a time associated with the route (e.g., a timestamp indicating when it was identified or modified by the route engine 324), information identifying items to be collected along the route, a distance required to travel the route, an amount of time (predicted or actual) required to travel the route, or any other suitable types of information that may be associated with a route.

In some embodiments, the online concierge system 102 further includes an interface engine 328. The interface engine 328 generates augmented reality elements that are overlaid onto portions of display areas of client devices 110 to which the augmented reality elements are sent. For example, an augmented reality element may be overlaid onto a portion of a display area of a client device 110 at which an item is detected (e.g., by the item/location detection engine 330, described below). Alternatively, in the above example, the augmented reality element may be overlaid onto another portion of the display area, such that it appears to float in a corner of the display area or near the item detected within the display area.

In some embodiments, the interface engine 328 generates augmented reality elements that include instructions for navigating routes (i.e., routes identified or modified by the route engine 324) within one or more warehouses 150. In such embodiments, the augmented reality elements may include turn-by-turn instructions for navigating the routes. For example, based on a route identified by the route engine 324, the interface engine 328 may generate augmented reality elements that correspond to arrows that, when overlaid onto a portion of a display area of a client device 110 at which the floor of a warehouse 150 is detected (e.g., by the item/location detection engine 330, described below), provide instructions for navigating the route. In this example, a user of the client device 110 may follow the arrows while at the warehouse 150 to navigate to multiple locations associated with items included in a shopping list. In the above example, if the user of the client device 110 deviates from the route, the route engine 324 may modify the route based on the current location of the client device 110 and the interface engine 328 may generate another set of augmented reality elements that correspond to arrows that provide instructions for navigating the modified route.

In some embodiments, the interface engine 328 generates augmented reality elements that call attention to items included among an inventory of a warehouse 150 and/or locations within the warehouse 150 associated with the items, in which the items and/or locations are detected within a display area of a client device 110. In such embodiments, an augmented reality element may call attention to an item or a location by highlighting it (e.g., with one or more colors) or with icons (e.g., arrows or circles), animations, etc. For example, an augmented reality element may call attention to an item detected within a display area of a client device 110 by encircling a portion of the display area at which the item is detected with a colored halo. As an additional example, if a location within a warehouse 150 (e.g., an area on a shelf) associated with an item is detected within a display area of a client device 110, an augmented reality element may call attention to the location with a flashing arrow that points to a portion of the display area at which the location is detected. An augmented reality element may call attention to an item for various reasons (e.g., if the item is included in an order or a shopping list, if the item is a replacement item, if one or more attributes of the item match profile information associated with a customer 204, etc.). For example, if a set of preferences associated with a customer 204 includes a dietary restriction indicating that the customer 204 is allergic to pineapple, an augmented reality element may call attention to an item that contains pineapple with a warning icon that hovers over or near a portion of a display area of a client device 110 at which the item is detected. In this example, if the set of preferences associated with the customer 204 also indicates that the customer 204 likes strawberries, another augmented reality element may call attention to strawberry-flavored candy with a heart icon that hovers over or near a portion of the display area of the client device 110 at which the item is detected. As yet another example, an augmented reality element may call attention to an item that is included in an order or a shopping list by encircling a portion of a display area of a client device 110 at which the item is detected with a colored halo. Similarly, an augmented reality element may call attention to a location within a warehouse 150 associated with an item if the item is included in an order or a shopping list, if the item is a replacement item, if one or more attributes of the item match one or more portions of profile information associated with a customer 204, etc.

In various embodiments, the interface engine 328 also generates augmented reality elements that call attention to attributes of items (e.g., sizes, varieties, brands, etc.) included among an inventory of a warehouse 150 detected within a display area of a client device 110. In some embodiments, an augmented reality element may call attention to an attribute of an item by highlighting it (e.g., with one or more colors) or with icons (e.g., arrows or circles), animations, etc. An augmented reality element may call attention to an attribute of an item for various reasons (e.g., if an item having the attribute is included in an order or a shopping list, if the attribute matches profile information associated with a customer 204, etc.). For example, suppose that profile information stored in the customer database 314 indicates that a customer 204 is allergic to soy and the item/location detection engine 330 (described below) detects that the customer 204 is holding an item that contains soy. In this example, the experience enhancement engine 338 (also described below) may infer that the customer 204 is thinking about purchasing the item and may match the soy ingredient with the profile information indicating the customer 204 is allergic to soy. Continuing with this example, based on the inference, the interface engine 328 may generate an augmented reality element that calls attention to the word "soy" in a list of ingredients on the item detected within a display area of a client device 110 with a warning icon and by encircling a portion of the display area in which the word is detected with a red halo. As an additional example, if an item (e.g., ground coffee) is included in a shopping list, an augmented reality element may call attention to information describing an attribute of the item (e.g., the word "ground" on the item) detected within a display area of a client device 110 by encircling a portion of the display area in which the information is detected with a green halo. In various embodiments, multiple augmented reality elements may call attention to different attributes by highlighting them differently (e.g., with different colors) or with different icons, different animations, etc. In the above example, if another item (e.g., whole bean coffee) is not included in the shopping list, another augmented reality element may call attention to information describing an attribute of the item (e.g., the word "whole bean" on the item) detected within the display area of the client device 110 by encircling a portion of the display area in which the information is detected with a red halo.

In some embodiments, the interface engine 328 may update an augmented reality element that calls attention to something. For example, if the item/location detection engine 330 (described below) determines that an item is not at a location within a warehouse 150 associated with the item, the interface engine 328 may update an augmented reality element that calls attention to the location (e.g., by graying it out, muting it, etc.). In some embodiments, an augmented reality element that calls attention to something may be updated if a user of a client device 110 adjusts one or more settings to change an appearance of the augmented reality element (e.g., by changing one or more colors of highlights, by changing the style of icons or animations, etc.).

In some embodiments, the interface engine 328 generates augmented reality elements that obscure items included among an inventory of a warehouse 150 detected within a display area of a client device 110. In such embodiments, an augmented reality element may obscure an item by blocking it partially or completely from view, blurring it, etc. For example, an augmented reality element, such as a colored rectangle or other shape that is mostly or completely opaque, may obscure an item if it is overlaid onto a portion of a display area of a client device 110 at which the item is detected. An augmented reality element may obscure an item for various reasons (e.g., if profile information associated with a customer 204 indicates that the customer 204 dislikes the item/attributes of the item, if the profile information indicates the customer 204 has a restriction, such as a dietary restriction, associated with the item, etc.). For example, suppose that the item/location detection engine 330 (described below) detects an advertisement for an item within a display area of a client device 110 and the experience enhancement engine 338 (also described below) matches an attribute of the item with information stored in the customer database 314 indicating that a customer 204 dislikes items with the attribute. In this example, the interface engine 328 may generate an augmented reality element that includes a coupon for a different item that does not have the attribute, in which the augmented reality element may obscure the advertisement if it is overlaid onto a portion of the display area at which the advertisement is detected. In some embodiments, a user of a client device 110 may adjust one or more settings to change an augmented reality element that obscures an item (e.g., by changing the method by which it obscures the item, by changing its opacity, etc.).

In various embodiments, the interface engine 328 generates augmented reality elements that compare items included among an inventory of a warehouse 150 detected within a display area of a client device 110. In such embodiments, an augmented reality element that compares items may include statistics associated with each item or other values of one or more attributes of each item. An augmented reality element may compare two or more items for various reasons (e.g., if a user of a client device 110 is holding the items, if the items are detected within a display area of a client device 110 for at least a threshold amount of time, etc.). For example, an augmented reality element that compares two sports drinks being held by a user of a client device 110 may include side-by-side statistics associated with the drinks (e.g., sugar content, number of calories, and price per ounce). Furthermore, an augmented reality element that compares items may highlight certain statistics, such as statistics related to profile information associated with a customer 204 that the experience enhancement engine 338 (described below) matches with one or more attributes of the items. In the above example, if the customer 204 is on a diet that limits their sugar intake, the augmented reality element may highlight the sugar content of the drinks. In some embodiments, a user of a client device 110 may adjust one or more settings to change an augmented reality element that compares items, such as how statistics or other values are displayed (e.g., numerically in a table or graphically in a chart), by changing the types of values displayed, etc.

The interface engine 328 also may generate augmented reality elements that recommend items included among an inventory of a warehouse 150 detected within a display area of a client device 110. An augmented reality element that recommends an item may include information associated with the item (e.g., brand name, item type, size, nutritional information, price, discounts or coupons that may apply to the item, etc.) and a reason the item is being recommended. An item may be recommended if a customer 204 is likely to purchase it (e.g., based on their order/purchase history or other profile information, other items included in an order or shopping list, etc.), if it is a replacement item for another item in a customer's order or shopping list that is out of stock, if it is a replacement item the customer 204 is likely to prefer to another item (e.g., in an order or a shopping list), etc. For example, if an item in a shopping list is out of stock, an augmented reality element may indicate this and recommend a replacement item that is similar to the one that is out of stock. In this example, the augmented reality element may include a brand of the replacement item, a description of the replacement item, and a price of the replacement item. In some embodiments, a user of a client device 110 may adjust one or more settings to change augmented reality elements that recommend items, such as types of information about the items being recommended (e.g., unit price, item price, brand, etc.), criteria for recommending items, etc.

In various embodiments, the interface engine 328 generates augmented reality elements that promote items included among an inventory of a warehouse 150 detected within a display area of a client device 110. In such embodiments, an augmented reality element may be generated based on content associated with the item (e.g., stored in the content database 334). An augmented reality element may promote an item for various reasons (e.g., it is a new item, a customer 204 is considering purchasing it, it is on sale or associated with a promotion, etc.). In some embodiments, the interface engine 328 generates augmented reality elements that promote items based on promotional content (e.g., advertisements, coupons, deals, etc.) associated with the items. For example, the interface engine 328 may generate an augmented reality element promoting an item that includes an advertisement or a promotion associated with the item (e.g., buy two, get one free). In various embodiments, the interface engine 328 generates augmented reality elements that promote items based on content describing how the items may be used. For example, if an item is a food item, the interface engine 328 may generate an augmented reality element promoting the item with a recipe that includes the item as an ingredient. As an additional example, if an item is an article of clothing or an accessory, the interface engine 328 may generate an augmented reality element promoting the item that includes an image or a video clip of a person modeling the item.

In some embodiments, the interface engine 328 generates an augmented reality element that includes a list of items included among an inventory of a warehouse 150. A list may include one or more items identified by a customer 204 (e.g., in an order received from the customer 204) or by a user of a client device 110 (e.g., in a shopping list received in an input via an interface generated and transmitted by the interface engine 328, as described below). For example, if a customer 204 places a delivery order via the online concierge system 102, the interface engine 328 may generate an augmented reality element that includes a list of items included in the order. In this example, the augmented reality element subsequently may be sent to a display area of a client device 110 associated with a shopper 208 assigned to fulfill the order. As an additional example, if information identifying items included in a shopping list is received in an input from a user of a client device 110 via the interface generated and transmitted by the interface engine 328, the interface engine 328 may generate an augmented reality element that includes the shopping list. In some embodiments, a list of items included in an augmented reality element may be ordered and/or numbered based on a route identified by the route engine 324. For example, a list of items included in an augmented reality element may be ordered and numbered based on an order in which they will be encountered along a route identified by the route engine 324.

In some embodiments, if the interface engine 328 generates an augmented reality element that includes a list of one or more items included among an inventory of a warehouse 150, the augmented reality element may be updated. In such embodiments, the interface engine 328 may update the augmented reality element if an item is unavailable, if an item is collected, if a replacement item is identified, etc. For example, if the interface engine 328 generates an augmented reality element that includes a shopping list, as each item in the shopping list is collected, the interface engine 328 may update the augmented reality element (e.g., by checking a checkbox next to each collected item, by crossing each collected item off the list, by removing each collected item from the list, etc.). In the above example, if the item/location detection engine 330 (described below) determines that one of the items is out of stock, the interface engine 328 may update the augmented reality element so that it indicates that the item is not in stock (e.g., by graying it out and adding a note indicating it is out of stock). Continuing with the above example, if the item replacement engine 332 (described below) subsequently identifies a replacement item, the interface engine 328 may update the augmented reality element so that it includes the replacement item and a note indicating it is a replacement item.

In various embodiments, the interface engine 328 also may generate an augmented reality element that includes a route for navigating from a location of a client device 110 within a warehouse 150 to one or more locations within the warehouse 150 associated with one or more items identified by a customer 204 to be collected during a shopping trip (e.g., items included in an order or a shopping list). An augmented reality element that includes a route may indicate a location of a client device 110 within a warehouse 150, locations within the warehouse 150 along the route at which one or more items identified by a customer 204 may be collected, and an order in which the item(s) may be collected. For example, an augmented reality element that includes a route may depict a layout of a warehouse 150, in which a location of a client device 110 and locations associated with items included in an order or shopping list are represented by icons that are connected by a line representing the route. In this example, the locations associated with the items may be numbered based on an order in which a user of the client device 110 will encounter the locations associated with the items by following the route. In some embodiments, an augmented reality element that includes a route may be updated (e.g., as a client device 110 moves within a warehouse 150, as items identified by a customer 204 are collected, as the route is modified by the route engine 324, etc.). In the above example, as the user of the client device 110 moves along the route, the icon representing the location of the client device 110 also moves, tracking the location of the client device 110 within the warehouse 150. In this example, as items are collected, icons representing the locations associated with the items may be removed, grayed out, checked off, etc.

Once the interface engine 328 generates or updates augmented reality elements, the interface engine 328 may send them to display areas of client devices 110. As described above, augmented reality elements are overlaid onto portions of display areas of client devices 110 to which the augmented reality elements are sent. An augmented reality element may be overlaid onto a portion of a display area of a client device 110 based on a location within the display area at which an item is detected (e.g., by the item/location detection engine 330, described below). For example, an augmented reality element may be overlaid onto a portion of a display area of a client device 110 at which an item is detected. Alternatively, in the above example, the augmented reality element may be overlaid onto another portion of the display area, such that it appears to float in a corner of the display area or near the item detected within the display area. In various embodiments, as physical elements, locations, etc. detected within a display area of a client device 110 move within the display area, one or more augmented reality elements may move as well. For example, if an augmented reality element calls attention to an item, as the item moves within a display area of a client device 110, the augmented reality element may move as well, such that it tracks the movement of the item. In some embodiments, augmented reality elements may be hidden by a user of a client device 110, such that they are not visible within a display area of the client device 110. For example, a user of a client device 110 may switch between different modes, such that in one mode, augmented reality elements are not visible within a display area of the client device 110, while in another mode, some or all of the augmented reality elements are visible within the display area of the client device 110.

In some embodiments, the interface engine 328 may store information describing augmented reality elements sent to client devices 110 in the customer database 314, such that this information is included among profile information associated with customers 204 associated with the client devices 110. In such embodiments, the customers 204 may be users of the client devices 110 or may have placed orders fulfilled by shoppers 208 who were using the client devices 110 when the augmented reality elements were sent. For example, suppose that the interface engine 328 sends an augmented reality element to a display area of a client device 110 associated with a customer 204, in which the augmented reality element promotes an item and includes a content item (e.g., a coupon) associated with the item. In this example, information describing the augmented reality element (information indicating that it promoted the item, information identifying the item and the content item, etc.) and a date and time that it was sent to the display area of the client device 110 may be stored among profile information associated with the customer 204 in the customer database 314.

The interface engine 328 also may generate and transmit an interface that includes one or more fields, buttons, or other interactive elements for receiving various inputs from a user of a client device 110. In some embodiments, the interface engine 328 may receive information identifying a warehouse 150 from a user of a client device 110 via the interface. For example, if a user of a client device 110 is at a warehouse 150, the user may select an option to share the location of the client device 110 by clicking on a button included in the interface. Alternatively, in the above example, the user may select the warehouse 150 from a drop-down menu included in the interface or type a name of a retailer associated with the warehouse 150 into a search box included in the interface and select the warehouse 150 from a list of results. In some embodiments, via the interface, the interface engine 328 also or alternatively may receive information from a user of a client device 110 identifying one or more items included among an inventory of a warehouse 150 to be collected from the warehouse 150 during a shopping trip. In such embodiments, upon receiving the input from the user via the interface, the interface engine 328 may retrieve information identifying items included among the inventory of the warehouse 150 based on the input (e.g., items having attributes with values that match at least a portion of the input identified by leveraging item embeddings). Via the interface, one or more items may then be added to a list of items (e.g., a shopping list) or subsequently removed from the list. For example, the interface may include a search box that allows a user to type in a name of an item, a description of an item, etc. In this example, the user may add one or more items included in a list of results to a shopping list and search for additional items to add to the shopping list.

In some embodiments, the interface generated and transmitted by the interface engine 328 also may receive inputs associated with one or more augmented reality elements generated by the interface engine 328. In such embodiments, the interface engine 328 may receive various requests from a user of a client device 110 via the interface (e.g., to accept a replacement item recommended in an augmented reality element, to adjust one or more settings associated with an augmented reality element, to check off items in a shopping list included in an augmented reality element, to claim an offer presented in an augmented reality element, etc.). For example, the interface engine 328 may receive a request from a user of a client device 110 to switch between different modes via the interface, in which different modes change the visibility of augmented reality elements to the user. As an additional example, if a replacement item is recommended to a user of a client device 110, the interface engine 328 may receive a request from the user to accept the replacement item via the interface and the interface engine 328 may communicate the acceptance to the route engine 324 so that the route may be modified based on a location associated with the replacement item. As yet another example, if a shopping list is included in an augmented reality element, as items included in the shopping list are collected, the interface engine 328 may receive requests from a user of a client device 110 to check the collected items off the list via the interface.

The interface engine 328 also may receive image or video data captured by a camera of a client device 110, in which the image or video data includes a display area of the client device 110. For example, if a client device 110 is a smartphone, a camera of the smartphone may capture image or video data that is visible within a display area of the smartphone to a user of the smartphone. As an additional example, if a client device 110 is a pair of augmented reality glasses, a camera of the augmented reality glasses may capture image or video data that is visible to a user wearing the augmented reality glasses. The interface engine 328 may communicate image or video data it receives to the item/location detection engine 330, which may then detect various physical elements (e.g., items), positions of physical elements, locations, etc. within a display area of a client device 110, as described below.

In some embodiments, the online concierge system 102 further includes an item/location detection engine 330. The item/location detection engine 330 may detect various physical elements (e.g., items included among an inventory of a warehouse 150, building elements, organizational elements, shopping carts or baskets, advertisements, etc.) within a display area of a client device 110. In some embodiments, the item/location detection engine 330 may do so based on images of the physical elements and image or video data captured by a camera of a client device 110. In such embodiments, images of the physical elements may include images of items included in a catalog stored in the inventory database 304, images of organizational elements and building elements included in a layout stored in the layout database 322, images of advertisements or other types of promotional content stored in the content database 334, etc. For example, suppose that video data captured by a camera of a client device 110 received by the interface engine 328 depicts a physical element, such as a box of cereal, displayed within a display area of the client device 110. In this example, the interface engine 328 may communicate the video data to the item/location detection engine 330, which may access images of items included in a catalog stored in the inventory database 304 and compare the depiction to the images of the items included in the catalog. In the above example, the item/location detection engine 330 may detect the box of cereal if the depiction has at least a threshold measure of similarity to one or more images of the box of cereal included in the catalog.

In some embodiments, the item/location detection engine 330 may detect physical elements using a machine-learned model. For example, the item/location detection engine 330 may provide image or video data as an input to a machine-learned model that is trained using images of various physical elements within one or more warehouses 150 (e.g., stored in the inventory database 304, the layout database 322, the content database 334, etc.). The item/location detection engine 330 may then receive an output from the model describing predicted likelihoods that each physical element is detected in the image or video data and determine that a physical element is detected if the corresponding predicted likelihood is at least a threshold likelihood. Alternatively, the item/location detection engine 330 may determine that the physical element is not detected if the corresponding predicted likelihood is less than the threshold likelihood.

In various embodiments, the item/location detection engine 330 may detect positions of physical elements relative to each other. In some embodiments, the item/location detection engine 330 may detect that a physical element is within another physical element, that a physical element is resting or stacked onto another physical element, etc. For example, if the item/location detection engine 330 detects an item included among an inventory of a warehouse 150 and a shopping basket, the item/location detection engine 330 also may detect that the item is within the shopping basket. In various embodiments, the item/location detection engine 330 may detect that items are being held by users of client devices 110 (e.g., based on the positions of the items relative to the users' hands). The item/location detection engine 330 may do so using various techniques, such as machine learning/object detection, depth perception, infrared/thermal imaging, or any other suitable technique or combination of techniques. For example, suppose that a client device 110 includes multiple infrared cameras, such that the client device 110 is capable of receiving depth perception information and heat-related information about an item detected within a display area of the client device 110 and other physical elements detected within the display area. In this example, the item/location detection engine 330 may detect that the item is being held if the item and a hand holding the item are moving together in directions and/or at speeds that are different from all or most other physical elements detected within the display area. In the above example, the item/location detection engine 330 also may detect that the item is being held if depth perception information indicates that the item and hand are closer to the client device 110 than the other physical elements and if heat-related information indicates that the item and hand emit different amounts of heat.

The item/location detection engine 330 also may detect a location and/or an orientation of a client device 110 within a warehouse 150. In such embodiments, the item/location detection engine 330 may receive (e.g., via the interface engine 328) image or video data including a display area of the client device 110 captured by a camera of the client device 110 and detect the location and/or orientation of the client device 110 based on the image or video data and the layout of the warehouse 150. For example, if a client device 110 is at a warehouse 150, the item/location detection engine 330 may receive image or video data captured by a camera of the client device 110 from the interface engine 328, in which the image or video data includes various physical elements within the warehouse 150. In this example, the item/location detection engine 330 may then compare the physical elements included in the image or video data to those of various locations within the warehouse 150 included in a layout of the warehouse 150. Continuing with this example, the item/location detection engine 330 may then detect a location and/or orientation within the warehouse 150 corresponding to the location and/or orientation of the client device 110 if the physical elements included in the image or video data have at least a threshold measure of similarity to the physical elements at the location.

In various embodiments, the item/location detection engine 330 may detect that a user of a client device 110 has deviated from a route. In such embodiments, the item/location detection engine 330 may do so based on the route, a layout of a warehouse 150, and image or video data captured by a camera of the client device 110. For example, the item/location detection engine 330 may detect a location of a client device 110 within a warehouse 150 based on a layout of the warehouse 150 and physical elements detected within a display area of the client device 110, as described above. In this example, the item/location detection engine 330 may detect that a user of the client device 110 has deviated from a route if the detected location does not correspond to a location within the warehouse 150 along the route. In some embodiments, upon detecting that a user of a client device 110 has deviated from a route, the item/location detection engine 330 may communicate this to the route engine 324 in association with information describing a current location of the client device 110 and the route engine 324 may then modify the route.

In some embodiments, a location within a warehouse 150 detected within a display area of a client device 110 by the item/location detection engine 330 may be associated with an item included among an inventory of the warehouse 150. For example, suppose that an item is associated with a particular shelf within a warehouse 150 at which the item may be collected. In this example, the item/location detection engine 330 may receive image or video data captured by a camera of a client device 110 from the interface engine 328 and compare physical elements included in the image or video data to those at the location associated with the item included in a layout of the warehouse 150. Continuing with this example, the item/location detection engine 330 may detect the location within the warehouse 150 associated with the item if the physical elements included in the image or video data have at least a threshold measure of similarity to the physical elements (i.e., the particular shelf and any surrounding physical elements) at the location associated with the item.

In various embodiments, once the item/location detection engine 330 has detected a location within a warehouse 150 associated with an item, the item/location detection engine 330 may determine whether the item is at the location. In some embodiments, the item/location detection engine 330 may do so based on one or more images of the item (e.g., one or more images included in a catalog stored in the inventory database 304) and image or video data captured by a camera of a client device 110 received from the interface engine 328. For example, the item/location detection engine 330 may receive image or video data captured by a camera of a client device 110 from the interface engine 328, in which the image or video data includes various physical elements displayed within the display area of the client device 110. In this example, once the item/location detection engine 330 has detected a location within a warehouse 150 associated with an item, the item/location detection engine 330 may access images of the item included in a catalog stored in the inventory database 304 and compare the physical elements included in the image or video data to the images of the item included in the catalog. Continuing with this example, if the physical elements have at least a threshold measure of similarity to the images of the item included in the catalog, the item/location detection engine 330 may determine the item is at the location associated with the item. However, in the above example, if the physical elements do not have at least the threshold measure of similarity to the images of the item included in the catalog, the item/location detection engine 330 may determine the item is not at the location associated with the item. In some embodiments, the item/location detection engine 330 may determine whether an item is at a location within a warehouse 150 associated with the item using a machine-learned model, as described above.

In some embodiments, once the item/location detection engine 330 has detected a location within a warehouse 150 associated with an item and determines that the item is not at the location, the item/location detection engine 330 also may determine whether the item is detected elsewhere within the warehouse 150. The item/location detection engine 330 may make this determination within a threshold amount of time of detecting the location associated with the item, within a threshold distance of detecting the location associated with the item, etc. For example, suppose that an item is misplaced on a shelf above or below a specific shelf corresponding to a location within a warehouse 150 associated with the item. In this example, once the item/location detection engine 330 has detected the location within the warehouse 150 associated with the item and determines that the item is not at the location, the item/location detection engine 330 may determine whether the item is detected within a display area of a client device 110 while the location is also detected within the display area.

In some embodiments, the item/location detection engine 330 may communicate information describing changes in inventory for a warehouse 150 to the inventory database 304, which may update inventory information associated with the warehouse 150 based on the information. In some embodiments, if the item/location detection engine 330 determines that an item is not at a location within a warehouse 150 associated with the item (or elsewhere within the warehouse 150, in some embodiments), the item/location detection engine 330 may communicate this to the inventory management engine 302. The inventory management engine 302 may then update inventory information associated with the warehouse 150 maintained in the inventory database 304 to reflect that the item is out of stock at the warehouse 150. In some embodiments, the item/location detection engine 330 also may detect a quantity of an item at a warehouse 150. In such embodiments, the item/location detection engine 330 may communicate the quantity to the inventory management engine 302, which may then update the inventory database 304 to reflect the quantity of the item detected at the warehouse 150.

Furthermore, in embodiments in which the item/location detection engine 330 detects a quantity of an item at a warehouse 150, the item/location detection engine 330 may update a layout of the warehouse 150 (e.g., stored in the layout database 322). In some embodiments, the item/location detection engine 330 may update a layout of a warehouse 150 if at least a threshold quantity of an item is detected at the warehouse 150 and the item/location detection engine 330 determines that the threshold quantity of the item is not at a location within the warehouse 150 associated with the item. For example, suppose that the item/location detection engine 330 detects at least ten cans of a particular brand and type of soup and determines that the cans of soup are not at a location within a warehouse 150 associated with the can of soup based on a layout of the warehouse 150. In this example, the item/location detection engine 330 may update the layout of the warehouse 150 to reflect that the location within the warehouse 150 at which the cans of soup were detected is associated with the particular brand and type of soup.

In some embodiments, the online concierge system 102 further includes an item replacement engine 332. The item replacement engine 332 identifies replacement items included among an inventory of a warehouse 150 that may replace other items included among the inventory of the warehouse 150 (e.g., if the items that may be replaced are not available, if a customer 204 is likely to prefer the replacement items to the items that may be replaced, etc.). The item replacement engine 332 may do so by accessing a set of attributes of an item that may be replaced and attributes of other items included among the inventory of a warehouse 150 (e.g., stored in the inventory database 304) and identifying one or more replacement items that each have a set of attributes that have at least a threshold measure of similarity to the set of attributes of the item that may be replaced. In various embodiments, the item replacement engine 332 may identify a replacement item by accessing a taxonomy maintained by the inventory management engine 302 described above and identifying a set of potential replacement items included in a most specific category in which the item that may be replaced is included. The item replacement engine 332 may then compare a set of attributes of each potential replacement item with a set of attributes of the item that may be replaced and identify a replacement item from the set of potential replacement items based on the comparison, in which the set of attributes of the replacement item has at least a threshold measure of similarity to the set of attributes of the item that may be replaced.

In some embodiments, replacement items also may be identified in other ways. In embodiments in which a shopper 208 is fulfilling a delivery order on behalf of a customer 204, replacement items may be identified by the customer 204. For example, if a shopper 208 is fulfilling an order on behalf of a customer 204 and an item, such as a particular brand and flavor of ice cream included in the order is not available, the shopper 208 may identify potential replacement items that have at least a threshold measure of similarity to the item (e.g., other flavors of ice cream of the same brand or other brands of ice cream of the same flavor). In this example, the shopper 208 may communicate the potential replacement items to a client device 110 associated with the customer 204 (e.g., by capturing an image or a video of them and sending the image or video via text or email, by listing or describing them during a phone call or in a text message, etc.). Continuing with this example, the shopper 208 may then receive a response from the customer 204 identifying a replacement item included among the potential replacement items. In various embodiments, the item replacement engine 332 may identify a set of potential replacement items that each have a set of attributes that have at least a threshold measure of similarity to a set of attributes of an item that may be replaced. The item replacement engine 332 may do so by accessing attributes of the item that may be replaced and attributes of other items included among the inventory of a warehouse 150 or by accessing a taxonomy maintained by the inventory management engine 302, as described above. In such embodiments, the item replacement engine 332 may then communicate information identifying the set of potential replacement items (and information identifying the item that may be replaced, in some embodiments) to the experience enhancement engine 338, which may then identify one or more replacement items from the set of potential replacement items, as described below.

Personalization Components

In some embodiments, the online concierge system 102 further includes a content database 334. The content database 334 may store various types of content associated with items included among an inventory of a warehouse 150. Examples of types of content that may be associated with an item include promotional content, content describing how the item may be used, or any other types of content that may be associated with an item. For example, promotional content associated with an item may include advertisements for the item, coupons or deals associated with the item, offers associated with the item (e.g., free samples), etc. As an additional example, content describing how an item may be used may include a recipe that includes the item as an ingredient, an image or a video demonstrating how the item may be used, etc. Content stored in the content database 334 may be obtained from users, third-party systems 130 (e.g., websites or applications), or any other suitable source, and stored in the content database 334. Additionally, each content item stored in the content database 334 may have one or more attributes describing the content. Examples of attributes of a content item include a type associated with the content item (e.g., coupon, advertisement, recipe, etc.), information identifying one or more items associated with the content item, attributes of each item associated with the content item, one or more dates associated with the content item (e.g., an expiration date associated with a coupon or offer), a type of data included in the content item (e.g., image data, video data, text data, etc.), or any other suitable types of information. Attributes of a content item may be provided by a source from which the content item was received or may be determined by the online concierge system 102 from information included in the content item.

Additionally, in some embodiments, the content database 334 maintains a content graph identifying connections between content items stored in the content database 334. A connection between content items indicates that the connected content items each have one or more common attributes. In some embodiments, a connection between content items indicates that a customer 204 included items associated with each connected content item in a common order or included items associated with each connected content item in orders the online concierge system 102 received from the customer 204 within a threshold amount of time of each other. In various embodiments, each connection between content items includes a value, with the value providing an indication of a strength of a connection between the content items.

In some embodiments, the online concierge system 102 further includes a profile update engine 336. The profile update engine 336 may update profile information associated with a customer 204 stored in the customer database 314. In some embodiments, the profile update engine 336 may update a set of preferences associated with a customer 204 stored in the customer database 314 based on other profile information associated with the customer 204. For example, suppose that profile information associated with a customer 204 indicates that the customer 204 has a goal of losing weight by following a particular diet. In this example, the profile update engine 336 may update a set of preferences associated with the customer 204 indicating that the customer 204 has a preference for food items that may be consumed when on the diet (e.g., foods low in sugar and saturated fat) and a dislike for food items that are to be avoided when on the diet (e.g., foods high in sugar and saturated fat).

In some embodiments, the online concierge system 102 further includes an experience enhancement engine 338. The experience enhancement engine 338 may communicate various types of information to the interface engine 328, which may then generate augmented reality elements based on this information. In some embodiments, this information may include inferences made by the experience enhancement engine 338, information describing replacement items identified by the experience enhancement engine 338, and/or information describing profile or other information associated with customers 204 that the experience enhancement engine 338 matches with attributes of items or other physical elements. In various embodiments, this information also may include information the experience enhancement engine 338 accesses from various databases (e.g., the inventory database 304, the customer database 314, the content database 334, etc.).

In some embodiments, the experience enhancement engine 338 infers an intent of a user of a client device 110 based on information detected by the item/location detection engine 330 and communicates the inference to the interface engine 328, which then generates an augmented reality element based on the inference. In various embodiments, the experience enhancement engine 338 also may communicate an inference to the interface engine 328 in association with information retrieved from one or more databases, which the interface engine 328 also may use to generate an augmented reality element. For example, if the item/location detection engine 330 detects that a user of a client device 110 is holding an item or if the item has been detected within a display area of the client device 110 for at least a threshold amount of time, the experience enhancement engine 338 may infer that the user is thinking about purchasing the item. In this example, the experience enhancement engine 338 may retrieve promotional content (e.g., a coupon and an advertisement) associated with the item from the content database 334 and communicate the inference and the promotional content to the interface engine 328, which may then generate an augmented reality element that promotes the item by including the promotional content. Alternatively, in the above example, the experience enhancement engine 338 may retrieve a set of content from the content database 334 describing how the item may be used (e.g., a recipe that includes the item as an ingredient) and communicate the content to the interface engine 328, which may then generate an augmented reality element that promotes the item by including the content. As an additional example, if the item/location detection engine 330 detects that a user of a client device 110 is holding two or more items or if the items have been detected within a display area of the client device 110 for at least a threshold amount of time, the experience enhancement engine 338 may infer that the user is comparing the items. In this example, the experience enhancement engine 338 may access attributes of the items stored in the inventory database 304 and communicate the inference and the attributes to the interface engine 328, which may then generate an augmented reality element that compares the items based on the inference and attributes.

In some embodiments, the experience enhancement engine 338 also may infer an intent of a customer 204 based on items included in an order or shopping list associated with the customer 204 and content stored in the content database 334 (e.g., recipes). In such embodiments, the experience enhancement engine 338 may then communicate the inference and any information related to the inference (e.g., retrieved from the inventory database 304, the content database 334, etc.) to the interface engine 328, which may generate an augmented reality element based on the inference and information. For example, suppose that two items (e.g., graham crackers and marshmallows) that are ingredients in a popular recipe stored in the content database 334 that calls for three ingredients are included in an order placed by a customer 204. In this example, if the last ingredient (e.g., chocolate) is not included in the order, the experience enhancement engine 338 may infer that the customer 204 is likely to purchase this item as well and may send information describing the inference and the item (e.g., retrieved from the inventory database 304) to the interface engine 328. In the above example, the interface engine 328 may then generate an augmented reality element recommending the item, which is subsequently sent to a display area of a client device 110 associated with a shopper 208 assigned to fulfill the customer's order. Continuing with this example, the shopper 208 may then communicate the recommendation to the customer 204.

In embodiments in which the experience enhancement engine 338 communicates information stored in various databases (e.g., the inventory database 304, the content database 334, etc.) to the interface engine 328, which then generates augmented reality elements based on the information, the experience enhancement engine 338 may identify the information to be communicated based on profile information stored in the customer database 314. In some embodiments, the experience enhancement engine 338 may identify the information to be communicated based on profile information associated with customers 204 describing augmented reality elements sent to display areas of client devices 110 associated with the customers 204 and purchase histories of the customers 204. For example, profile information associated with a customer 204 may indicate that the customer 204 was much more likely to purchase items within a threshold amount of time after augmented reality elements including coupons associated with the items were sent to a display area of a client device 110 associated with the customer 204 than after augmented reality elements including other types of content were sent to a display area of a client device 110 associated with the customer 204. In the above example, based on the profile information, the experience enhancement engine 338 may be more likely to retrieve coupons from the content database 334 than other types of content to communicate to the interface engine 328, which may then generate an augmented reality element to be sent to a display area of a client device 110 associated with the customer 204 based on the content.

In some embodiments, the experience enhancement engine 338 also may use a machine-learned model to identify information to communicate to the interface engine 328. For example, the experience enhancement engine 338 may provide profile information associated with a customer 204 and information identifying an item as an input to a machine-learned model. In this example, the model may be trained using profile information associated with customers 204 stored in the customer database 314 (e.g., information describing augmented reality elements previously sent to display areas of client devices 110 associated with the customers 204, preferences associated with the customers 204, order/purchase histories associated with the customers 204, etc.) and content stored in the content database 334. Continuing with this example, the experience enhancement engine 338 may then receive an output from the model describing predicted likelihoods that the customer 204 will purchase the item after an augmented reality element that may be generated based on each content item associated with the item is sent to a display area of a client device 110 associated with the customer 204. In the above example, the experience enhancement engine 338 may identify one or more content items to communicate to the interface engine 328 associated with the highest predicted likelihood(s).

The experience enhancement engine 338 also may match profile information associated with a customer 204 (e.g., stored in the customer database 314) with one or more attributes of one or more items included among an inventory of a warehouse 150 (e.g., stored in the inventory database 304). The experience enhancement engine 338 may then communicate information describing the match to the interface engine 328, which may generate an augmented reality element based on the information. For example, if profile information stored in the customer database 314 indicates that a customer 204 is on a low-sugar diet, the experience enhancement engine 338 may match this information with attributes of items the customer 204 is holding corresponding to their sugar content and communicate information describing the match to the interface engine 328. In this example, based on the information describing the match, an augmented reality element generated by the interface engine 328 comparing the items may highlight their sugar content. As an additional example, suppose that attributes of a roll of paper towels stored in the inventory database 304 indicate a brand, an item type, and a size associated with the paper towels and profile information associated with a customer 204 stored in the customer database 314 includes an order history that indicates the customer 204 orders the roll of paper towels with the corresponding attributes about once every month. In the above example, if the customer 204 has not ordered the roll of paper towels with the corresponding attributes in about a month, the experience enhancement engine 338 may match the attributes with the order history and communicate information describing the match to the interface engine 328. Continuing with this example, based on the match, the interface engine 328 may then generate an augmented reality element that recommends the roll of paper towels (e.g., with a "Buy it again" heading) when overlaid onto a display area of a client device 110 associated with a shopper 208 fulfilling an order on behalf of the customer 204. In this example, the shopper 208 may then communicate the recommendation to the customer 204.

In various embodiments, the experience enhancement engine 338 also may match profile information associated with a customer 204 (e.g., stored in the customer database 314) with attributes of other types of physical elements within a warehouse 150, such as advertisements or coupons (e.g., stored in the content database 334 and/or the inventory database 304). In such embodiments, the experience enhancement engine 338 may communicate information describing the match to the interface engine 328, which may generate an augmented reality element based on the information. For example, suppose that an advertisement for a can of coconut milk is detected within a display area of a client device 110 associated with a customer 204 and attributes of the advertisement include nutritional information associated with the can of coconut milk stored in the inventory database 304 corresponding to 13 grams of saturated fat. In this example, if a dietary restriction associated with the customer 204 stored in the customer database 314 indicates that the customer 204 is on a diet that prohibits saturated fat, the experience enhancement engine 338 may match the attribute with the dietary restriction and communicate information describing the match to the interface engine 328. Continuing with this example, based on the information describing the match, the interface engine 328 may generate an augmented reality element that obscures the advertisement for the can of coconut milk when overlaid onto a portion of the display area of the client device 110 at which the advertisement is detected.

As described above, the experience enhancement engine 338 also may identify replacement items that may replace other items included among an inventory of a warehouse 150 (e.g., if the items that may be replaced are not available, if a customer 204 is likely to prefer the replacement items to the items that may be replaced, etc.). The experience enhancement engine 338 may do so upon receiving information identifying a set of potential replacement items from the item replacement engine 332, in which the set of potential replacement items each have a set of attributes that have at least a threshold measure of similarity to a set of attributes of an item that may be replaced. The experience enhancement engine 338 may then identify one or more replacement items from the set of potential replacement items based on profile information associated with a customer 204 stored in the customer database 314 and attributes of the potential replacement items stored in the inventory database 304. For example, if a set of preferences associated with a customer 204 indicates that the customer 204 prefers organic food items to non-organic food items, the experience enhancement engine 338 may be more likely to identify an organic replacement item than a non-organic replacement item. As an additional example, if a set of dietary restrictions associated with a customer 204 indicates that the customer 204 is a vegetarian, the experience enhancement engine 338 may be more likely to identify a vegetarian replacement item than a non-vegetarian replacement item. As yet another example, if an order history associated with a customer 204 indicates that the customer 204 has often ordered a potential replacement item, the experience enhancement engine 338 may be more likely to identify this potential replacement item as a replacement for an item than other potential replacement items. In embodiments in which a shopper 208 is fulfilling an order on behalf of a customer 204, the experience enhancement engine 338 may retrieve profile information associated with the customer 204 based on details associated with the order identifying the customer 204 (e.g., stored in the transaction records database 308 or the training datasets 320).

In some embodiments, the experience enhancement engine 338 may predict likelihoods that customers 204 will accept potential replacement items and/or prefer potential replacement items to items that may be replaced. To do so, the experience enhancement engine 338 may access profile information associated with a customer 204 (e.g., stored in the customer database 314), attributes of each potential replacement item, and attributes of an item that may be replaced (e.g., stored in the inventory database 304). The experience enhancement engine 338 may then predict a likelihood that the customer 204 will accept each potential replacement item or prefer each potential replacement item to the item that may be replaced based on the profile information, the attributes of the item that may be replaced, and the attributes of each potential replacement item. In some embodiments, the experience enhancement engine 338 may predict the likelihoods by matching profile information associated with the customer 204 with a set of attributes of each potential replacement item and a set of attributes of the item that may be replaced. For example, suppose that a customer 204 is holding an item that they have never purchased and that the only profile information associated with the customer 204 that matches an attribute of the item corresponds to an item type for one or more items included in their purchase history. In this example, suppose also that the purchase history indicates that the customer 204 previously purchased a potential replacement item several times when it was on sale, such that the profile information matches multiple attributes of the potential replacement item (e.g., its brand, type, etc. and information indicating it is on sale). In the above example, the experience enhancement engine 338 may then predict a likelihood (e.g., 85%) that the customer 204 will prefer the potential replacement item to the item they are holding based on the match. Alternatively, if the item the customer 204 was holding in the above example is included in the customer's order or shopping list and the item is not available, the experience enhancement engine 338 may predict a likelihood (e.g., 85%) that the customer 204 will accept the potential replacement item in an analogous manner.

The experience enhancement engine 338 may then identify replacement items from potential replacement items based on the predicted likelihoods that customers 204 will accept the replacement items and/or prefer the replacement items to items that may be replaced. In some embodiments, the experience enhancement engine 338 may identify one or more replacement items associated with at least a threshold likelihood from the set of potential replacement items. Alternatively, the experience enhancement engine 338 may rank the set of potential replacement items based on the predicted likelihood associated with each potential replacement item and identify one or more replacement items based on the ranking (e.g., one or more replacement items associated with at least a threshold ranking). In embodiments in which the experience enhancement engine 338 identifies one or more replacement items that may replace another item that is not available, the experience enhancement engine 338 may then communicate information to the interface engine 328 identifying the replacement item(s). In embodiments in which the experience enhancement engine 338 identifies one or more replacement items that a customer 204 is likely to prefer to another item that may be replaced, the experience enhancement engine 338 may then communicate information to the interface engine 328 identifying the replacement item(s) and information indicating why the customer 204 is likely to prefer the replacement item(s) to the item that may be replaced. The interface engine 328 may then generate an augmented reality element that recommends the replacement item(s). In embodiments in which multiple replacement items are identified, an augmented reality element that recommends the replacement items may list the replacement items in an order based on the ranking described above.

In some embodiments, the experience enhancement engine 338 also may identify replacement items using a machine-learned model. For example, the experience enhancement engine 338 may provide attributes of a customer 204 as an input to a machine-learned model that is trained using profile information associated with customers 204 (e.g., order/purchase histories, preferences, etc.) stored in the customer database 314 and attributes of items included among an inventory of a warehouse 150 stored in the inventory database 304. The experience enhancement engine 338 may then receive an output from the model describing predicted likelihoods that the customer 204 will purchase each item included among the inventory of the warehouse 150. In this example, if the experience enhancement engine 338 is identifying a replacement item that replaces an item that is not available, the experience enhancement engine 338 may identify a potential replacement item as a replacement item if the potential replacement item is associated with at least a threshold likelihood. Alternatively, in the above example, if the experience enhancement engine 338 is identifying a replacement item that replaces an item that is available, a potential replacement item may be identified as a replacement item if the potential replacement item is associated with a likelihood that is greater than a likelihood associated with the item that may be replaced.

Figure 3B:
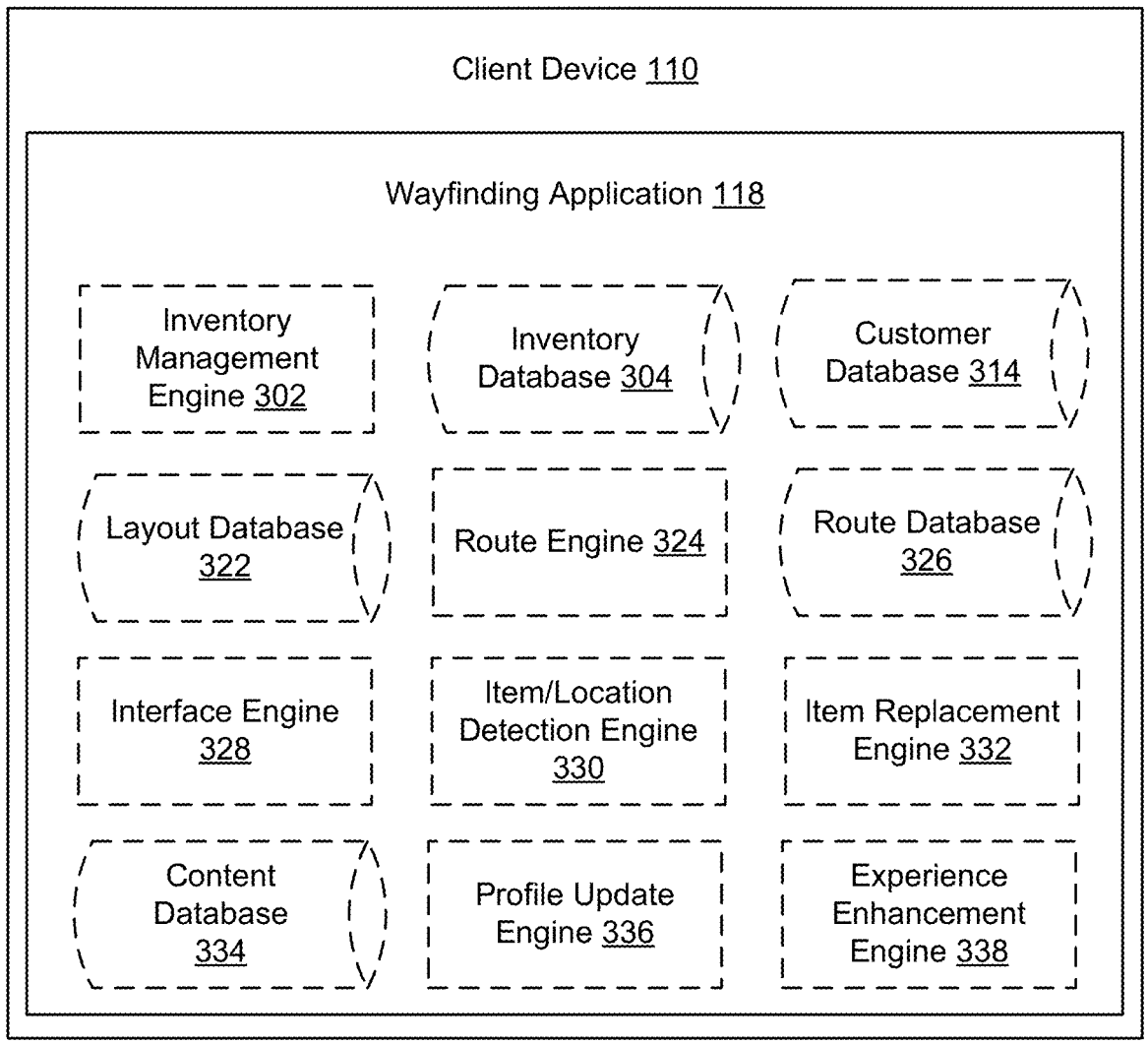
FIG. 3B is a diagram of a wayfinding application, according to one or more embodiments.

FIG. 3B is a diagram of a wayfinding application 118, according to one embodiment. In various embodiments, the wayfinding application 118 may include different or additional modules than those described in conjunction with FIG. 3B. Furthermore, in some embodiments, the wayfinding application 118 includes fewer modules than those described in conjunction with FIG. 3B.

The components of the wayfinding application 118 illustrated in FIG. 3B function in the same manner described above in conjunction with FIG. 3A. As described above, the wayfinding application 118 displays augmented reality elements for navigating to a location of an item within a warehouse 150. As also described above, the wayfinding application 118 may be executed on a client device 110 associated with a shopper 208 fulfilling an order on behalf of a customer 204 or a client device 110 associated with a customer 204 of a retailer associated with a warehouse 150, in which the customer 204 may or may not be associated with the online concierge system 102. Furthermore, in various embodiments, one or more components of the wayfinding application 118 may interact with one or more components of the online concierge system 102, the CMA 206, and/or the SMA 212, while in other embodiments, the wayfinding application 118 is a standalone application.

Customer Mobile Application

Figure 4A:
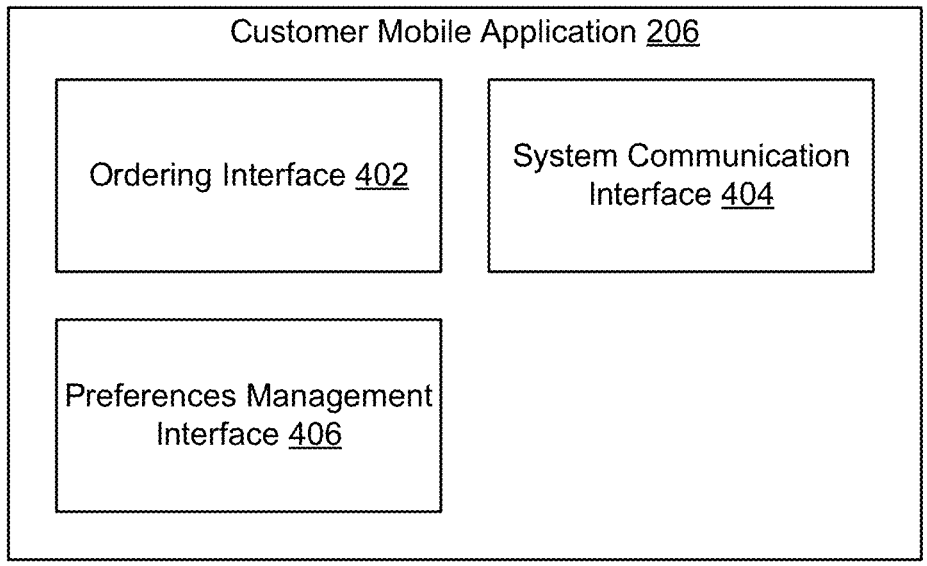
FIG. 4A is a diagram of a customer mobile application (CMA), according to one or more embodiments.

FIG. 4A is a diagram of the customer mobile application (CMA) 206, according to one or more embodiments. The CMA 206 includes an ordering interface 402, which provides an interactive interface which a customer 204 may use to browse through and select products and place an order. The CMA 206 also includes a system communication interface 404 which, among other functions, receives inventory information from the online concierge system 102 and transmits order information to the system 102. The CMA 206 also includes a preferences management interface 406 which allows a customer 204 to manage basic information associated with his/her account, such as his/her home address and payment instruments. The preferences management interface 406 may also allow a customer 204 to manage other details such as his/her favorite or preferred warehouses 150, preferred delivery times, special instructions for delivery, and so on.

Shopper Mobile Application

Figure 4B:
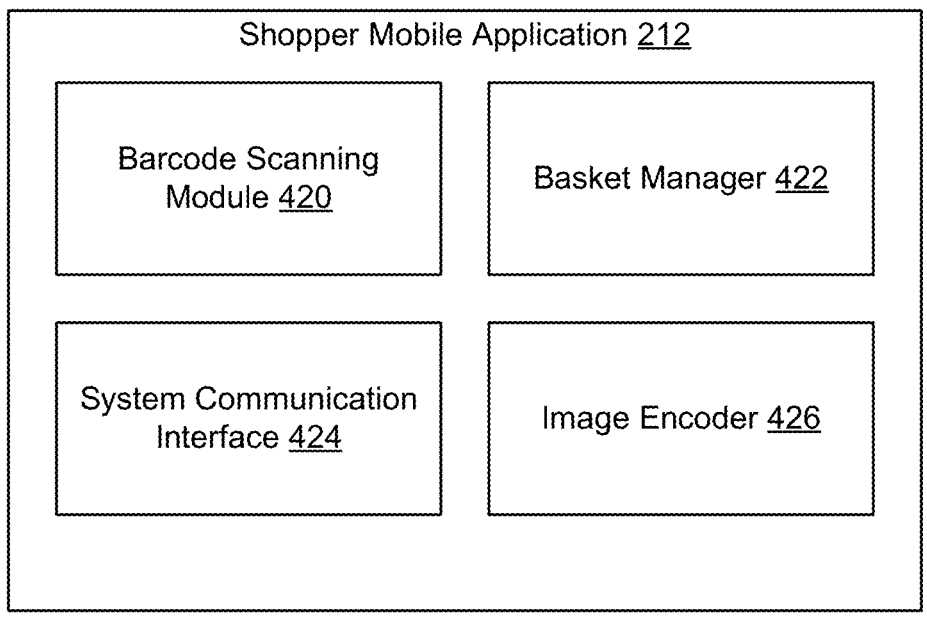
FIG. 4B is a diagram of a shopper mobile application (SMA), according to one or more embodiments.

FIG. 4B is a diagram of the shopper mobile application (SMA) 212, according to one or more embodiments. The SMA 212 includes a barcode scanning module 420, which allows a shopper 208 to scan an item at a warehouse 150 (such as a can of soup on the shelf at a grocery store). The barcode scanning module 420 may also include an interface, which allows a shopper 208 to manually enter information describing an item (such as its serial number, SKU, quantity and/or weight) if a barcode is not available to be scanned. The SMA 212 also includes a basket manager 422, which maintains a running record of items collected by a shopper 208 for purchase at a warehouse 150. This running record of items is commonly known as a "basket." In one embodiment, the barcode scanning module 420 transmits information describing each item (such as its cost, quantity, weight, etc.) to the basket manager 422, which updates its basket accordingly. The SMA 212 also includes a system communication interface 424, which interacts with the online concierge system 102. For example, the system communication interface 424 receives an order from the online concierge system 102 and transmits the contents of a basket of items to the online concierge system 102. The SMA 212 also includes an image encoder 426 which encodes the contents of a basket into an image. For example, the image encoder 426 may encode a basket of goods (with an identification of each item) into a QR code, which may then be scanned by an employee of a warehouse 150 at check-out.

Figure 5:
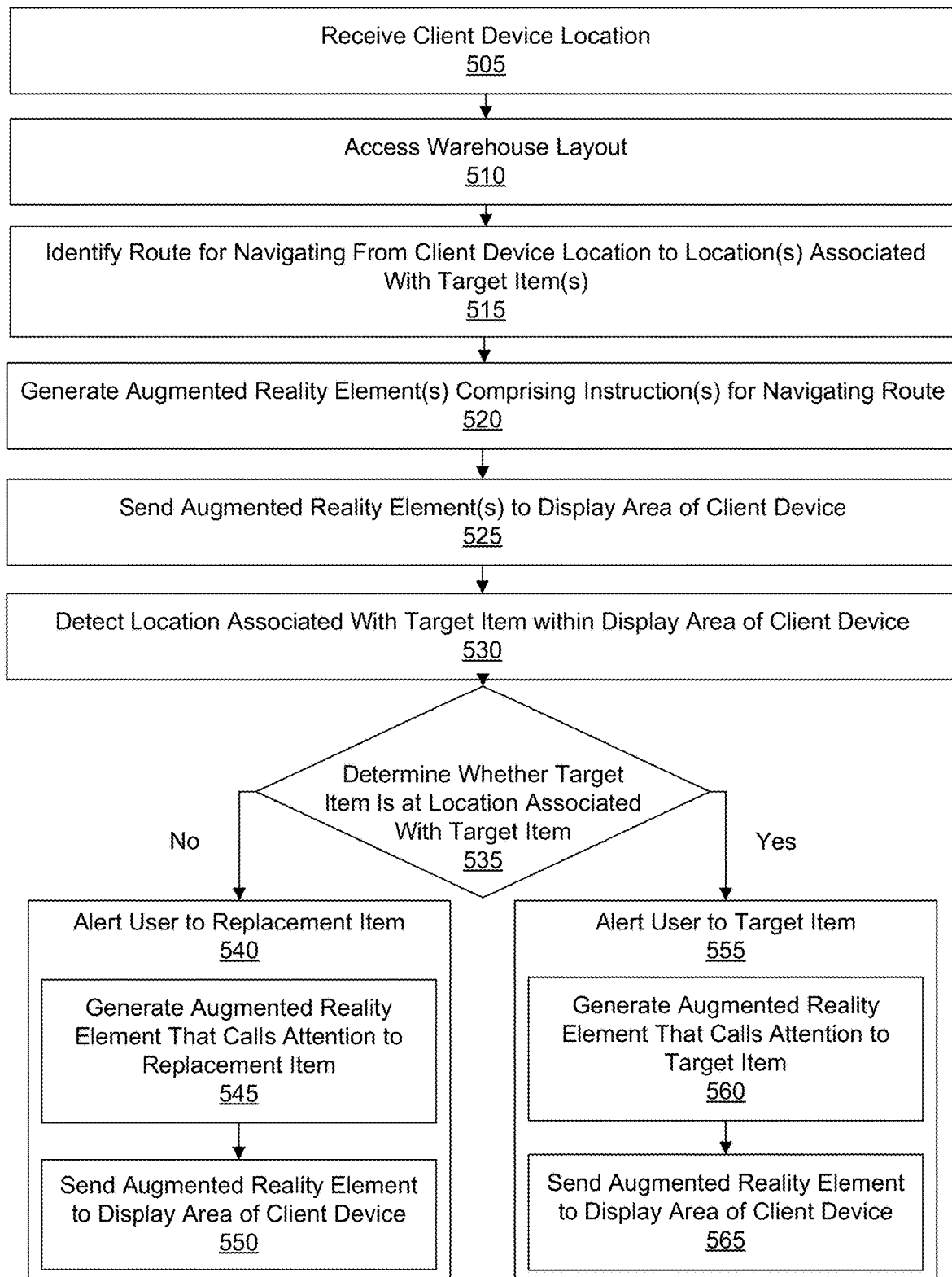
FIG. 5 is a flowchart of a method for displaying augmented reality elements for navigating to a location of an item within a warehouse, according to one or more embodiments.

Displaying Augmented Reality Elements for Navigating to a Location of an Item within a Warehouse FIG. 5 is a flowchart of a method for displaying augmented reality elements for navigating to a location of an item within a warehouse 150, according to one or more embodiments. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the wayfinding application 118 and/or the online concierge system 102 in various embodiments, while in other embodiments, the steps of the method are performed by any application and/or any online system capable of retrieving items.

In various embodiments, the user of the client device 110 described below is a shopper 208 associated with the online concierge system 102 fulfilling an order on behalf of a customer 204, while in other embodiments, the user is a customer 204 of the retailer associated with the warehouse 150, who may or may not be associated with the online concierge system 102. Therefore, in some embodiments, "customer 204" may refer to a user of the online concierge system 102 who has placed an order to be fulfilled by a shopper 208, while in other embodiments, "customer 204" may refer to the user of the client device 110 who is doing their own shopping at the warehouse 150.

The wayfinding application 118 or the online concierge system 102 may receive 505 (e.g., via the route engine 324) a current location of the client device 110 (e.g., an augmented reality device or a mobile device) within a warehouse 150 (e.g., a physical grocery store), in which the warehouse 150 is associated with a retailer and multiple items included among an inventory of the warehouse 150. In some embodiments, the location of the client device 110 within the warehouse 150 may be received 505 from a location tracking system 152 at the warehouse 150. For example, the location tracking system 152 at the warehouse 150 may include one or more sensors 156 that detect client devices 110 scanning for Wi-Fi networks and record MAC addresses associated with any detected client devices 110. In this example, the location tracking system 152 may track the location of the client device 110 (e.g., in various aisles or departments) as it moves throughout the warehouse 150 based on its MAC address and image or video data of the user of the client device 110 captured by one or more cameras included in a surveillance system 154 of the location tracking system 152. Continuing with this example, the wayfinding application 118 or the online concierge system 102 may receive 505 the location of the client device 110 within the warehouse 150 from the location tracking system 152. In some embodiments, the wayfinding application 118 or the online concierge system 102 also or alternatively may receive other types of information from the location tracking system 152 (e.g., information identifying the warehouse 150, a time at which the client device 110 was at the warehouse 150 or at a specific location within the warehouse 150, etc.). In the above example, the wayfinding application 118 or the online concierge system 102 may receive 505 the location of the client device 110 within the warehouse 150 in association with a warehouse identifier associated with the warehouse 150 and a timestamp indicating a date and time at which the client device 110 was at the location within the warehouse 150.

The wayfinding application 118 or the online concierge system 102 also may receive information identifying the warehouse 150. Information identifying the warehouse 150 may be received from a location tracking system 152 at the warehouse 150, as described above. The wayfinding application 118 or the online concierge system 102 also or alternatively may receive (e.g., using the route engine 324) information identifying the warehouse 150 from the client device 110 via GPS triangulation, cell tower triangulation, Wi-Fi positioning, or any other suitable technique. For example, if the client device 110 is at the warehouse 150, the wayfinding application 118 or the online concierge system 102 may track the location of the client device 110 (e.g., via GPS triangulation), access information describing the locations of various warehouses 150 (e.g., stored in the layout database 322 or a warehouse database), and identify the warehouse 150 based on the location of the client device 110. In embodiments in which the user of the client device 110 is a shopper 208 fulfilling an order on behalf of the customer 204, the online concierge system 102 may identify the warehouse 150 at which the order is to be fulfilled (e.g., using the shopper management engine 310). In such embodiments, the online concierge system 102 may then communicate information identifying the warehouse 150 to the wayfinding application 118.

In some embodiments, the wayfinding application 118 or the online concierge system 102 also or alternatively may receive information identifying the warehouse 150 via an interface that the wayfinding application 118 or the online concierge system 102 generates and transmits (e.g., using the interface engine 328). In such embodiments, the interface may include one or more fields, buttons, or other interactive elements for receiving various inputs from the user of the client device 110. For example, if the user of the client device 110 is at the warehouse 150, the user may select an option to share the location of the client device 110 by clicking on a button included in the interface. Alternatively, in the above example, the user may select the warehouse 150 from a drop-down menu included in the interface or type a name of the retailer associated with the warehouse 150 into a search box included in the interface and select the warehouse 150 from a list of results.

In various embodiments, the wayfinding application 118 or the online concierge system 102 also may receive information identifying one or more items ("target items") included among the inventory of the warehouse 150 to be collected from the warehouse 150 by the user of the client device 110. The target item(s) may correspond to one or more items included in an order or a shopping list. In some embodiments, the wayfinding application 118 or the online concierge system 102 may receive information identifying the target item(s) in an input from the user of the client device 110 via the interface described above. In such embodiments, upon receiving the input from the user via the interface, the wayfinding application 118 or the online concierge system 102 may retrieve information identifying items included among the inventory of the warehouse 150 based on the input (e.g., items having attributes with values that match at least a portion of the input identified by leveraging item embeddings). Via the interface, one or more items may then be added to a list of target items (e.g., a shopping list) or subsequently removed from the list. For example, the interface may include a search box that allows the user to type in a name of an item, a description of an item, etc. In this example, the user may add one or more items included in a list of results to a list of target items and search for additional items to add to the list of target items. In embodiments in which the user of the client device 110 is a shopper 208 fulfilling an order on behalf of the customer 204, the online concierge system 102 may receive information identifying the target item(s) included in the order (e.g., via the order fulfillment engine 306). In such embodiments, the online concierge system 102 may then communicate information identifying the target item(s) to the wayfinding application 118.

The wayfinding application 118 or the online concierge system 102 then accesses 510 (e.g., using the route engine 324) a layout of the warehouse 150 (e.g., from the layout database 322). In embodiments in which layouts of multiple warehouses 150 are maintained (e.g., in the layout database 322), the layout of the warehouse 150 accessed 510 by the wayfinding application 118 or the online concierge system 102 may be identified based on information identifying the warehouse 150 received by the methods described above. In some embodiments, the layout of the warehouse 150 may be received from the retailer associated with the warehouse 150 and updated by the retailer or the wayfinding application 118 or the online concierge system 102 (e.g., using the item/location detection engine 330), as described below. The layout of the warehouse 150 may be stored in association with information that uniquely identifies the warehouse 150, such as a name of the warehouse 150, a geographic location of the warehouse 150, etc. For example, the layout of the warehouse 150 may be stored in association with GPS coordinates associated with the warehouse 150, a combination of a name of the retailer associated with the warehouse 150 and a city and state in which the warehouse 150 is located, etc.

The layout of the warehouse 150 may describe departments and/or physical elements within the warehouse 150, such as organizational elements, including aisles, shelves within the aisles, various display areas (e.g., frozen or refrigerated display cases, display tables, and sample and promotional displays), etc., as well as their arrangement within the warehouse 150. In addition to organizational elements, the layout of the warehouse 150 also may describe additional physical elements within the warehouse 150, such as items included among the inventory of the warehouse 150, service counters (e.g., for various departments and/or checkout counters), and various building elements (e.g. entrances/exits, floors, ceilings, walls, stairs, elevators, etc.), and their arrangement within the warehouse 150. The layout of the warehouse 150 also may include one or more images of departments and physical elements within the warehouse 150 captured from one or more angles, positions, etc. In some embodiments, the layout of the warehouse 150 also may describe dimensions associated with the warehouse 150 (e.g., dimensions associated with departments and/or organizational elements within the warehouse 150). For example, the layout of the warehouse 150 may describe lengths of various aisles, distances between the aisles, heights of shelves, etc. Furthermore, in various embodiments, the layout of the warehouse 150 may describe congestion/traffic within the warehouse 150. For example, the layout of the warehouse 150 may describe certain times or days of the week when particular service counters or aisles with sample displays are more congested than others.

Additionally, the layout of the warehouse 150 may describe a set of locations within the warehouse 150 associated with each item included among its inventory. A location within the warehouse 150 associated with an item may correspond to a particular area within the warehouse 150 at which the item may be collected. For example, the layout of the warehouse 150 may describe one or more locations within the warehouse 150 associated with an item, in which each location corresponds to a particular aisle, a particular shelf, a particular display table, a particular promotional display, etc., at which the item may be collected.

In various embodiments, once the layout of the warehouse 150 has been accessed 510, the wayfinding application 118 or the online concierge system 102 also may detect (e.g., using the item/location detection engine 330) the location and/or orientation of the client device 110 within the warehouse 150. In such embodiments, the wayfinding application 118 or the online concierge system 102 may receive (e.g., via the interface engine 328) image or video data including a display area of the client device 110 captured by a camera of the client device 110 and detect the location and/or orientation of the client device 110 based on the image or video data and the layout of the warehouse 150. For example, if the client device 110 is a smartphone, the camera of the smartphone may capture image or video data that is visible within the display area of the smartphone to the user of the smartphone. Alternatively, in the above example, if the client device 110 is a pair of augmented reality glasses, the camera of the augmented reality glasses may capture image or video data that is visible to the user wearing the augmented reality glasses. In the above example, the image or video data may depict various physical elements within the warehouse 150, such as items included among the inventory of the warehouse 150, service counters (e.g., for various departments and/or checkout counters), organizational elements (e.g., aisles, shelves, display areas, etc.), and various building elements (e.g. entrances/exits, floors, ceilings, walls, stairs, elevators, etc.). Continuing with this example, the wayfinding application 118 or the online concierge system 102 may then compare the physical elements included in the image or video data to those of various locations within the warehouse 150 included in the layout of the warehouse 150. In this example, the wayfinding application 118 or the online concierge system 102 may then detect a location and/or orientation within the warehouse 150 corresponding to the location and/or orientation of the client device 110 if the physical elements included in the image or video data have at least a threshold measure of similarity to the physical elements at the location.

Figure 6:
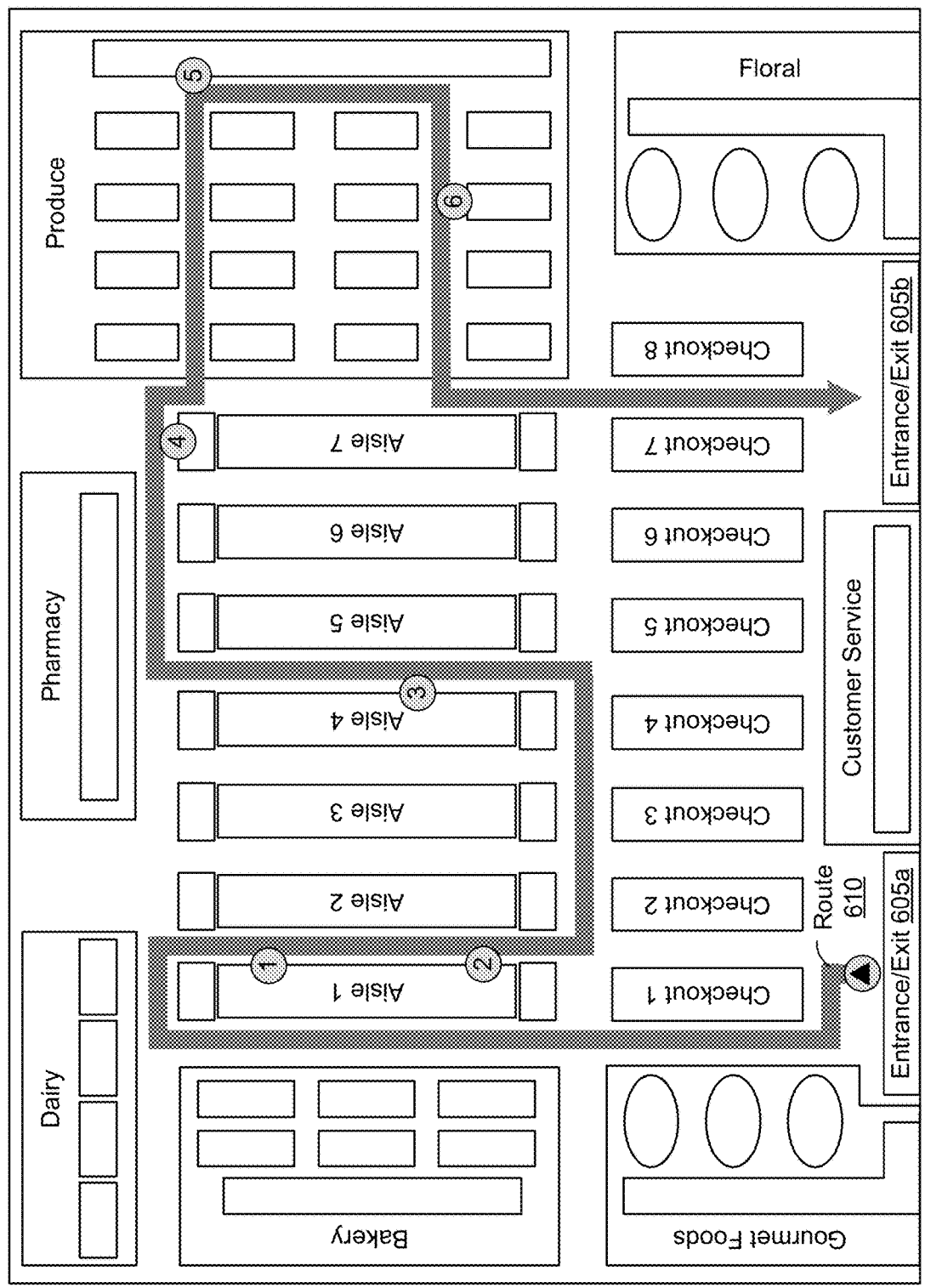
FIG. 6 illustrates a route for navigating from a location of a client device within a warehouse to one or more locations within the warehouse associated with one or more items, according to one or more embodiments.

The wayfinding application 118 or the online concierge system 102 then identifies 515 (e.g., using the route engine 324) a route for navigating from the location of the client device 110 within the warehouse 150 to one or more locations within the warehouse 150 associated with the target item(s). The wayfinding application 118 or the online concierge system 102 may identify 515 the route based on the location of the client device 110 within the warehouse 150, information identifying the target item(s), and the layout of the warehouse 150. For example, as shown in FIG. 6, which illustrates a route for navigating from a location of a client device 110 within a warehouse 150 to one or more locations within the warehouse 150 associated with one or more items, according to one or more embodiments, suppose that the client device 110 is at a location within the warehouse 150 corresponding to an entrance 605a or exit 605b of the warehouse 150. In this example, based on the layout of the warehouse 150, the wayfinding application 118 or the online concierge system 102 may identify 515 a route 610 for navigating from the entrance 605a to the locations of six target items within the warehouse 150, in which the six target items are included in a shopping list, and then to the exit 605ab. In the above example, the route 610 may indicate an order in which the target items may be collected and the locations along the route 610 (e.g., specific shelves or locations within specific display cases) at which the target items may be collected.

The wayfinding application 118 or the online concierge system 102 may identify 515 the route 610 using various techniques. In some embodiments, the route 610 may be identified 515 based on a distance from the location of the client device 110 within the warehouse 150 to the location(s) within the warehouse 150 associated with the target item(s). For example, the wayfinding application 118 or the online concierge system 102 may identify 515 the route 610 that requires the user of the client device 110 to travel a minimum distance to collect the target item(s). In various embodiments, the wayfinding application 118 or the online concierge system 102 also or alternatively may identify 515 the route 610 based on a predicted amount of time required to travel from the location of the client device 110 within the warehouse 150 to the location(s) within the warehouse 150 associated with the target item(s). For example, based on information describing congestion/traffic within the warehouse 150 during different times of the day described in the layout of the warehouse 150, the wayfinding application 118 or the online concierge system 102 may identify 515 the route 610 that is predicted to take the user of the client device 110 a shortest amount of time to travel to collect the target item(s).

In some embodiments, the wayfinding application 118 or the online concierge system 102 also may identify 515 the route 610 using a machine-learned model. For example, the wayfinding application 118 or the online concierge system 102 may identify 515 the route 610 using a machine-learned model that is trained based on information describing routes 610 and other information associated with the routes 610 (e.g., stored in the route database 326). In this example, the wayfinding application 118 or the online concierge system 102 may provide an input to the machine-learned model including the location of the client device 110 within the warehouse 150, information identifying the target item(s), and the layout of the warehouse 150. Continuing with this example, the wayfinding application 118 or the online concierge system 102 may receive an output from the model identifying 515 the route 610 that requires the user of the client device 110 to travel a minimum distance to collect the target item(s) and/or the route 610 that is predicted to take the user a shortest amount of time to collect the target item(s).

In some embodiments, the wayfinding application 118 or the online concierge system 102 may be configured to store information describing the route 610 (e.g., in the route database 326). In such embodiments, the information describing the route 610 may be stored in association with various types of information. The information describing the route 610 may be stored in association with information describing the client device 110 associated with the route 610 (e.g., an IP address associated with the client device 110), the user associated with the client device 110 (e.g., a username, email address, or other identifier associated with the user), and/or the warehouse 150 associated with the route 610 (e.g., a warehouse identifier). The information describing the route 610 also or alternatively may be stored in association with a time associated with the route 610 (e.g., a timestamp indicating when it was identified 515), information identifying the target item(s) to be collected along the route 610, a distance required to travel the route 610, an amount of time (predicted or actual) required to travel the route 610, or any other suitable types of information that may be associated with the route 610.

Referring back to FIG. 5, the wayfinding application 118 or the online concierge system 102 then generates 520 (e.g., using the interface engine 328) a set of augmented reality elements that includes a set of instructions for navigating the route 610 within the warehouse 150. The set of augmented reality elements may include turn-by-turn instructions for navigating the route 610. For example, based on the route 610, the wayfinding application 118 or the online concierge system 102 may generate 520 the set of augmented reality elements that correspond to signs that, when overlaid onto a portion of the display area of the client device 110, provide instructions for navigating the route 610.

Figure 7A:
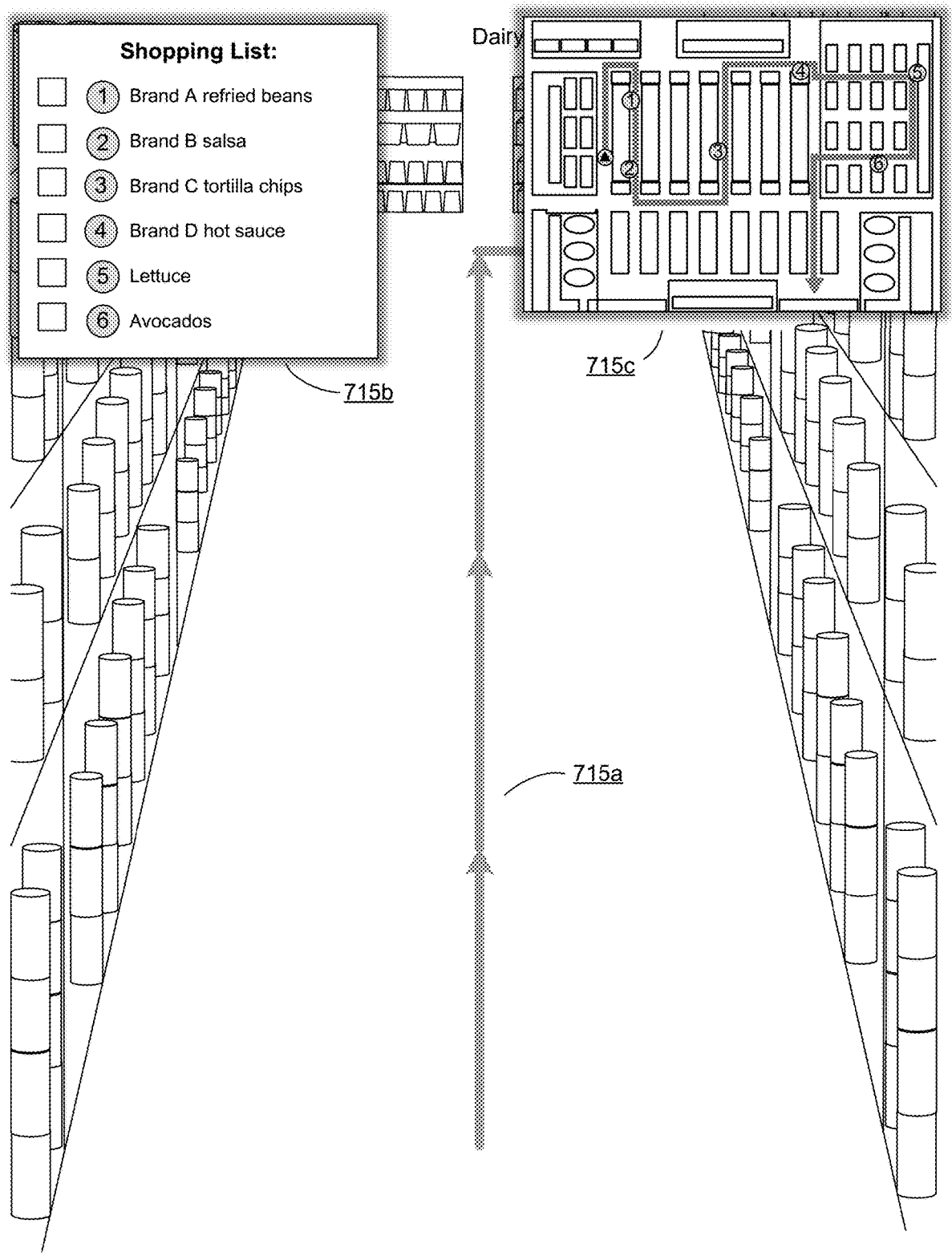
FIG. 7A illustrates a set of augmented reality elements for navigating a route within a warehouse to one or more locations associated with one or more items, according to one or more embodiments.

The wayfinding application 118 or the online concierge system 102 then sends 525 (e.g., using the interface engine 328) the set of augmented reality elements to the display area of the client device 110. An augmented reality element may be overlaid onto a portion of the display area of the client device 110 at which an item is detected (e.g., by the item/location detection engine 330) or onto another portion of the display area, such that it appears to float in the portion of the display area or near an item detected within the display area. For example, FIG. 7A illustrates a set of augmented reality elements 715a for navigating a route 610 within a warehouse 150 to one or more locations associated with one or more items, according to one or more embodiments, and continues the example described above in conjunction with FIG. 6. In this example, the set of augmented reality elements 715a correspond to arrows that are overlaid onto a portion of the display area of the client device 110 at which the floor of the warehouse 150 is detected, such that the arrows provide instructions for navigating the route 610. In this example, the user of the client device 110 may follow the arrows while at the warehouse 150 to navigate to locations associated with the six target items.

In some embodiments, the wayfinding application 118 or the online concierge system 102 also may generate (e.g., using the interface engine 328) an augmented reality element 715 that includes a list of the target item(s) and send (e.g., using the interface engine 328) the augmented reality element 715 to the display area of the client device 110. As described above, the target item(s) may be identified by the customer 204 (e.g., in an order received from the customer 204) or by the user of the client device 110 (e.g., in an input received via the interface described above). For example, if the customer 204 places a delivery order via the online concierge system 102, the wayfinding application 118 or the online concierge system 102 may generate an augmented reality element 715 that includes a list of the target item(s), in which each target item corresponds to an item included in the order. In this example, the augmented reality element 715 subsequently may be sent to the display area of the client device 110, in which the user of the client device 110 is a shopper 208 assigned to fulfill the order. As an additional example, if information identifying the target item(s) is received in an input from the user of the client device 110 via the interface described above, in which each target item is included in a shopping list, the wayfinding application 118 or the online concierge system 102 may generate an augmented reality element 715 that includes the shopping list. In some embodiments, a list of the target item(s) included in an augmented reality element 715 may be ordered and/or numbered based on the route 610. In the example of FIG. 7A, an augmented reality element 715b including a list of the target items is overlaid onto an upper-left corner of the display area of the client device 110, in which the list of the six target items corresponds to a shopping list. In this example, the target items in the shopping list included in the augmented reality element 715b are ordered and numbered based on an order in which they will be encountered along the route 610.

In various embodiments, the wayfinding application 118 or the online concierge system 102 also may generate (e.g., using the interface engine 328) an augmented reality element 715 that includes the route 610 for navigating from the location of the client device 110 within the warehouse 150 to the location(s) within the warehouse 150 associated with the target item(s). The augmented reality element 715 may indicate the location of the client device 110 within the warehouse 150, the location(s) within the warehouse 150 along the route 610 at which the target item(s) may be collected, and an order in which the target item(s) may be collected. For example, as shown in FIG. 7A, an augmented reality element 715c that includes the route 610 is overlaid onto an upper-right corner of the display area of the client device 110. In this example, the augmented reality element 715c depicts the layout of the warehouse 150, in which the location of the client device 110 and locations associated with the six target items included in the shopping list included in augmented reality element 715b are represented by icons that are connected by a line representing the route 610. In this example, the locations associated with the target items are numbered based on an order in which the user of the client device 110 will encounter the locations associated with the target items by following the route 610.

Referring back to FIG. 5, the wayfinding application 118 or the online concierge system 102 then detects 530 (e.g., via the item/location detection engine 330), within the display area of the client device 110, a location within the warehouse 150 associated with a target item. For example, suppose that the target item is associated with a particular shelf within the warehouse 150 at which the target item may be collected. In this example, the wayfinding application 118 or the online concierge system 102 may receive image or video data captured by the camera of the client device 110 and compare physical elements included in the image or video data to those at the location associated with the target item included in the layout of the warehouse 150. Continuing with this example, the wayfinding application 118 or the online concierge system 102 may detect 530 the location within the warehouse 150 associated with the target item if the physical elements included in the image or video data have at least a threshold measure of similarity to the physical elements (i.e., the particular shelf and any surrounding physical elements) at the location associated with the target item.

Figure 7B:
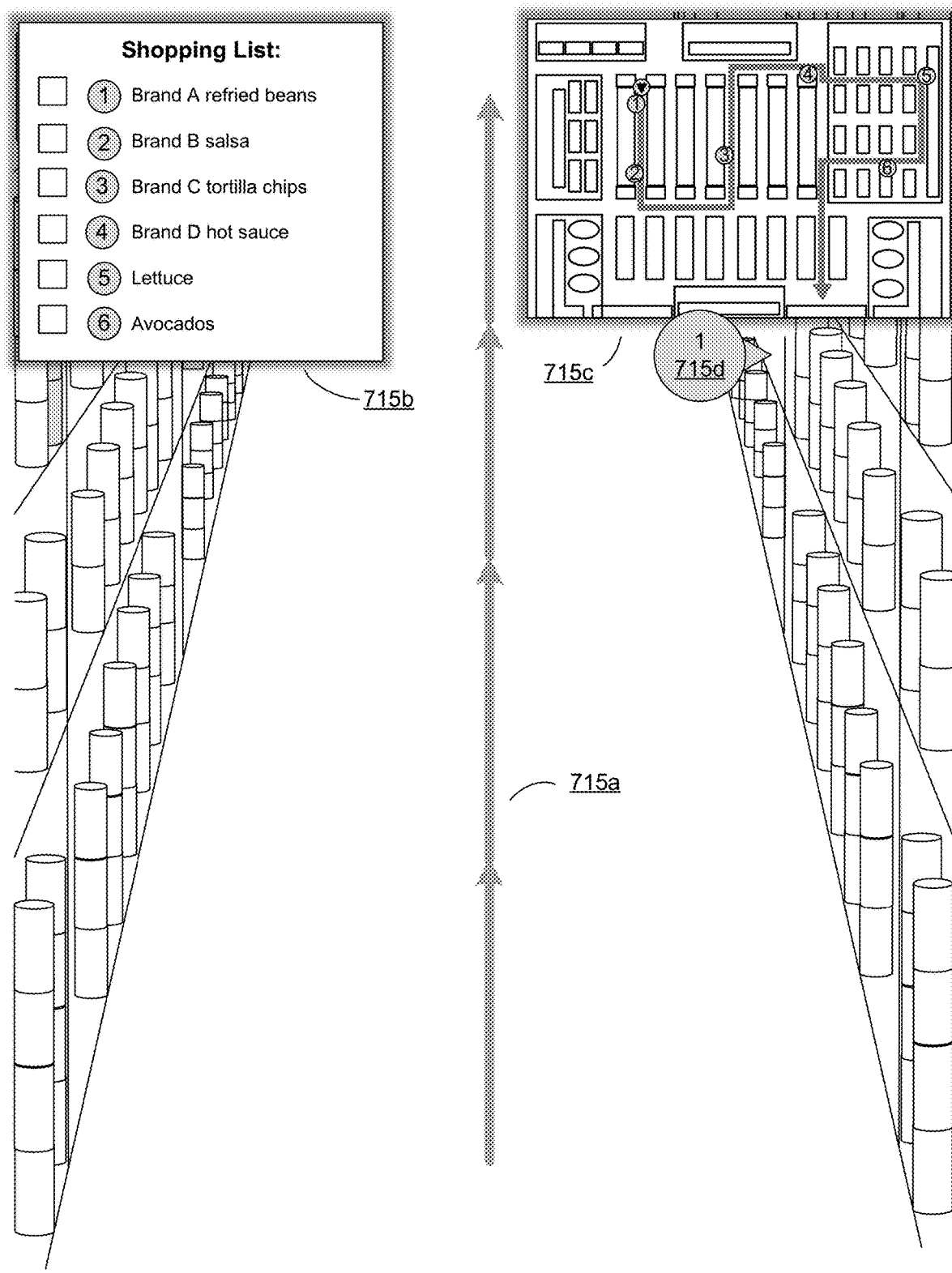
FIG. 7B illustrates a set of augmented reality elements for navigating a route within a warehouse to one or more locations associated with one or more items, according to one or more embodiments.

In some embodiments, the wayfinding application 118 or the online concierge system 102 may generate (e.g., using the interface engine 328) an augmented reality element 715 that calls attention to the location within the warehouse 150 associated with the target item and send (e.g., using the interface engine 328) the augmented reality element 715 to the display area of the client device 110. The augmented reality element 715 may call attention to the location within the warehouse 150 associated with the target item by highlighting it (e.g., with one or more colors) or with icons (e.g., arrows or circles), animations, etc. An example of the augmented reality element 715 is shown in FIG. 7B, which illustrates a set of augmented reality elements 715 for navigating a route 610 within a warehouse 150 to one or more locations associated with one or more items, according to one or more embodiments, and continues the example described above in conjunction with FIGS. 6 and 7A. In the example of FIG. 7B, by following the augmented reality elements 715a for navigating the route 610, the user of the client device 110 may approach the location within the warehouse 150 associated with a target item. In this example, an augmented reality element 715d that calls attention to the location of the target item detected 530 within the display area of the client device 110 is an icon with a number (1) that corresponds to the number of the target item within the shopping list included in augmented reality element 715b. The same icon also represents the location associated with the target item included in augmented reality element 715c that includes the route 610. Continuing with this example, the augmented reality element 715d that calls attention to the location associated with the target item hovers next to and points to a particular portion of the display area in which a shelf corresponding to the location associated with the target item is detected 530.

In various embodiments, as physical elements, locations, etc. detected 530 within the display area of the client device 110 (e.g., by the item/location detection engine 330) move within the display area, one or more augmented reality elements 715 may move as well. For example, in FIG. 7B, if the location associated with the target item moves within the display area of the client device 110, the augmented reality element 715d may move as well, such that it tracks the movement of the location. In some embodiments, augmented reality elements 715 may be hidden by the user of the client device 110, such that they are not visible within the display area of the client device 110. For example, the user of the client device 110 may switch between different modes via the interface described above, such that in one mode, all types of augmented reality elements 715 are visible within the display area of the client device 110, in another mode, only certain types of augmented reality elements 715 (e.g., those including shopping lists and routes 610) are visible, and in yet another mode, none of the types of augmented reality elements 715 are visible.

Referring again to FIG. 5, once the wayfinding application 118 or the online concierge system 102 has detected 530 the location within the warehouse 150 associated with the target item, the wayfinding application 118 or the online concierge system 102 may determine 535 (e.g., using the item/location detection engine 330) whether the target item is at the location. In some embodiments, the wayfinding application 118 or the online concierge system 102 may do so based on one or more images of the target item (e.g., one or more images included in a catalog stored in the inventory database 304) and image or video data captured by the camera of the client device 110. For example, the wayfinding application 118 or the online concierge system 102 may receive image or video data captured by the camera of the client device 110, which includes various physical elements displayed within the display area of the client device 110. In this example, once the wayfinding application 118 or the online concierge system 102 detects 530 the location within the warehouse 150 associated with the target item, it may access images of the target item included in a catalog (e.g., stored in the inventory database 304) and compare the physical elements to the images of the target item. Continuing with this example, if the physical elements have at least a threshold measure of similarity to the images of the target item included in the catalog, the wayfinding application 118 or the online concierge system 102 may determine 535 the target item is at the location associated with the target item. However, in the above example, if the physical elements do not have at least the threshold measure of similarity to the images of the target item included in the catalog, the wayfinding application 118 or the online concierge system 102 may determine 535 the target item is not at the location associated with the target item.

In some embodiments, the wayfinding application 118 or the online concierge system 102 also may determine 535 whether the target item is at the location within the warehouse 150 associated with the target item using a machine-learned model. For example, the wayfinding application 118 or the online concierge system 102 may provide image or video data captured by the camera of the client device 110 as an input to a machine-learned model that is trained using images of various physical elements within the warehouse 150, such as the target item and other items included among the inventory of the warehouse 150. The wayfinding application 118 or the online concierge system 102 may then receive an output from the model describing predicted likelihoods that each physical element is detected in the image or video data and determine 535 that the target item is detected if the corresponding predicted likelihood is at least a threshold likelihood. Alternatively, the wayfinding application 118 or the online concierge system 102 may determine 535 that the target item is not detected if the corresponding predicted likelihood is less than the threshold likelihood.

In some embodiments, if the wayfinding application 118 or the online concierge system 102 determines 535 that the target item is not at the location within the warehouse 150 associated with the target item, it also may determine (e.g., using the item/location detection engine 330) whether the target item is detected elsewhere within the warehouse 150. In such embodiments, this determination may be made within a threshold amount of time of detecting 530 the location associated with the target item, within a threshold distance of detecting 530 the location associated with the target item, etc. For example, suppose that the target item is misplaced on a shelf above or below a specific shelf corresponding to the location within the warehouse 150 associated with the target item. In this example, once the wayfinding application 118 or the online concierge system 102 has detected 530 the location within the warehouse 150 associated with the target item and determines 535 that the target item is not at the location, the wayfinding application 118 or the online concierge system 102 may determine whether the target item is detected within the display area of the client device 110 while the location is also detected 530 within the display area. If the wayfinding application 118 or the online concierge system 102 determines 535 that the target item is not at the location within the warehouse 150 associated with the target item (or elsewhere within the warehouse 150, in some embodiments), inventory information associated with the warehouse 150 (e.g., stored in the inventory database 304) may be updated (e.g., using the inventory management engine 302) to reflect that the target item is out of stock at the warehouse 150.

Upon determining 535 that the target item is not at the location within the warehouse 150 associated with the target item (or elsewhere within the warehouse 150, in various embodiments), the wayfinding application 118 or the online concierge system 102 may receive information identifying a replacement item included among the inventory of the warehouse 150. In embodiments in which the user of the client device 110 is a shopper 208 fulfilling a delivery order on behalf of the customer 204, the replacement item may be identified by the customer 204. For example, suppose that the target item is a particular brand and flavor of ice cream that is not available and the user of the client device 110 is a shopper 208 fulfilling an order on behalf of the customer 204. In this example, the user may identify potential replacement items that have at least a threshold measure of similarity to the target item (e.g., other flavors of ice cream of the same brand or other brands of ice cream of the same flavor). In the above example, the user may then communicate the potential replacement items to a client device 110 associated with the customer 204 (e.g., by capturing an image or a video of them and sending the image or video via text or email, by listing or describing them during a phone call or in a text message, etc.). Continuing with this example, the user may then receive a response from the customer 204 identifying a replacement item included among the potential replacement items.

Alternatively, in some embodiments, the wayfinding application 118 or the online concierge system 102 may identify (e.g., using the item replacement engine 332) the replacement item. In such embodiments, the wayfinding application 118 or the online concierge system 102 may do so by accessing a set of attributes of the target item and attributes of other items included among the inventory of the warehouse 150 (e.g., stored in the inventory database 304) and identifying the replacement item that has a set of attributes that have at least a threshold measure of similarity to the set of attributes of the target item. In various embodiments, the wayfinding application 118 or the online concierge system 102 may identify the replacement item by accessing a taxonomy (e.g., maintained by the inventory management engine 302) and identifying a set of potential replacement items included in a most specific category in which the target item is included. The wayfinding application 118 or the online concierge system 102 may then compare a set of attributes of each potential replacement item with a set of attributes of the target item and identify the replacement item from the set of potential replacement items based on the comparison, in which the set of attributes of the replacement item has at least a threshold measure of similarity to the set of attributes of the target item.

In various embodiments, the wayfinding application 118 or the online concierge system 102 also may identify (e.g., using the experience enhancement engine 338) the replacement item from a set of potential replacement items that each have a set of attributes that have at least a threshold measure of similarity to a set of attributes of the target item. In such embodiments, the replacement item may be identified based on profile information associated with the customer 204 (e.g., stored in the customer database 314) and attributes of the potential replacement items (e.g., stored in the inventory database 304). The wayfinding application 118 or the online concierge system 102 may identify (e.g., using the item replacement engine 332) the set of potential replacement items by accessing attributes of the target item and attributes of other items included among the inventory of the warehouse 150 or by accessing a taxonomy (e.g., maintained by the inventory management engine 302), as described above.

Once the replacement item is identified, the wayfinding application 118 or the online concierge system 102 may then alert 540 the user of the client device 110 to the replacement item by generating 545 (e.g., using the interface engine 328) an augmented reality element 715 that calls attention to the replacement item and sending 550 (e.g., using the interface engine 328) the augmented reality element 715 to the display area of the client device 110. Similar to the augmented reality element 715 described above, the augmented reality element 715 may call attention to the replacement item by highlighting it (e.g., with one or more colors) or with icons (e.g., arrows or circles), animations, etc. In some embodiments, prior to generating 545 the augmented reality element 715 that calls attention to the replacement item, the wayfinding application 118 or the online concierge system 102 may first detect (e.g., via the item/location detection engine 330) the location within the warehouse 150 associated with the replacement item. In such embodiments, the wayfinding application 118 or the online concierge system 102 may then generate (e.g., using the interface engine 328) an augmented reality element 715 that calls attention to the location within the warehouse 150 associated with the replacement item and send (e.g., using the interface engine 328) the augmented reality element 715 to the display area of the client device 110. Furthermore, in embodiments in which the wayfinding application 118 or the online concierge system 102 generates and sends an augmented reality element 715 that calls attention to the location within the warehouse 150 associated with the target item, the wayfinding application 118 or the online concierge system 102 may update (e.g., using the interface engine 328) the augmented reality element 715 and send the updated augmented reality element 715 to the display area of the client device 110.

Figure 7C:
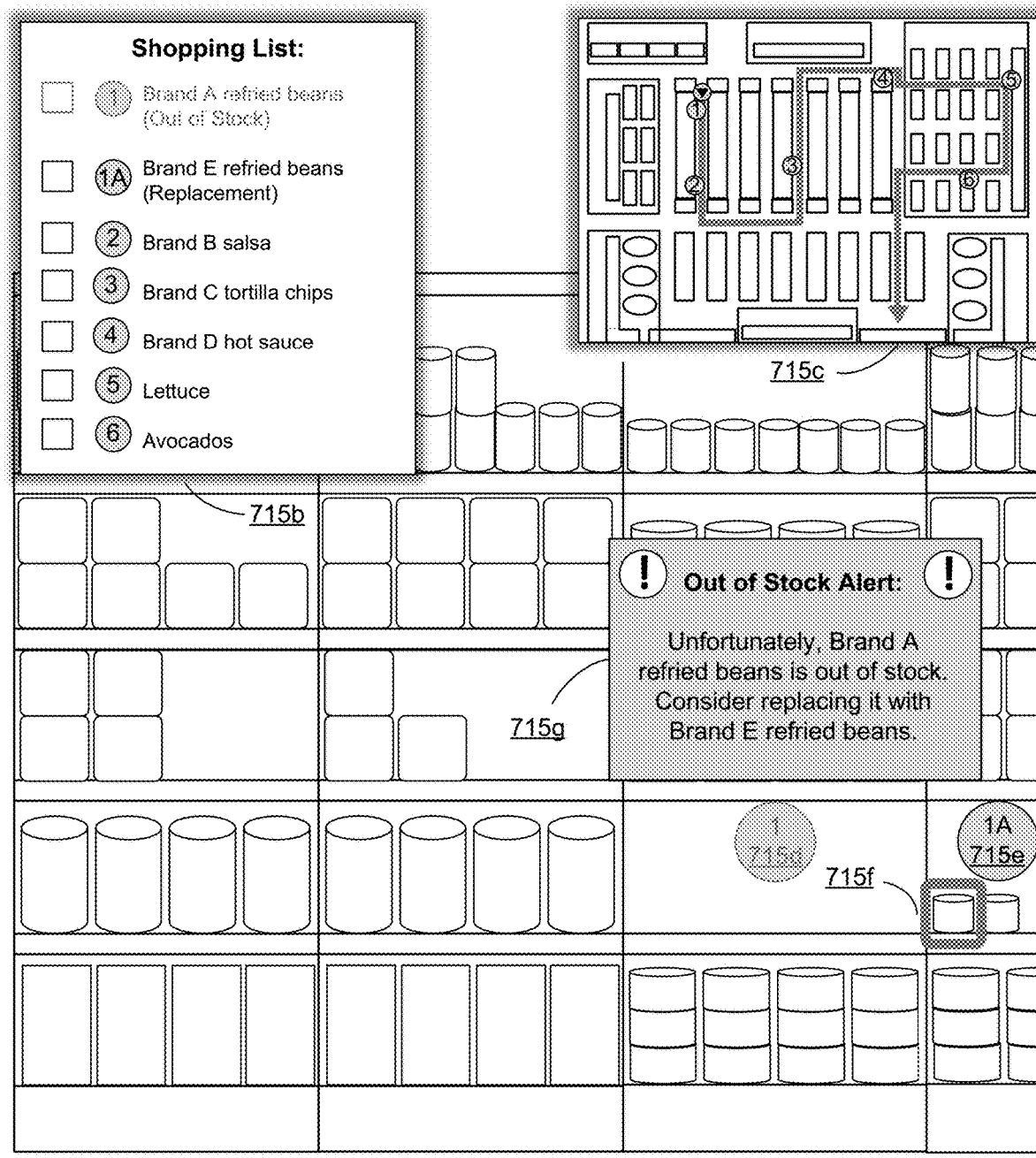
FIG. 7C illustrates a set of augmented reality elements that calls attention to a replacement item within a warehouse, according to one or more embodiments.

An example of the augmented reality element 715 that calls attention to the replacement item is shown in FIG. 7C, which illustrates a set of augmented reality elements 715 that calls attention to a replacement item within a warehouse 150, according to one or more embodiments, and continues the example described above in conjunction with FIGS. 6, 7A, and 7B. In the example of FIG. 7C, once the user of the client device 110 arrives at the location within the warehouse 150 associated with the target item, the wayfinding application 118 or the online concierge system 102 determines 535 that the target item is not at the location and detects the location within the warehouse 150 associated with the replacement item. The wayfinding application 118 or the online concierge system 102 then updates the augmented reality element 715d that calls attention to the location within the warehouse 150 associated with the target item by graying it out and sends the updated augmented reality element 715d to the display area of the client device 110. The wayfinding application 118 or the online concierge system 102 also generates an augmented reality element 715e that calls attention to the location of the replacement item detected within the display area of the client device 110, which is an icon with a number (1A) that corresponds to the number of the replacement item within the shopping list included in augmented reality element 715b. In this example, once sent to the display area of the client device 110, the augmented reality element 715e hovers next to a particular portion of the display area in which a shelf corresponding to the location associated with the replacement item is detected (e.g., by the item/location detection engine 330). In the above example, the wayfinding application 118 or the online concierge system 102 alerts 540 the user to the replacement item by generating 545 an additional augmented reality element 715f that calls attention to the replacement item and sending 550 the additional augmented reality element 715f to the display area of the client device 110. Continuing with this example, the additional augmented reality element 715f that calls attention to the replacement item is a halo that is overlaid onto a portion of the display area of the client device 110 at which the replacement item is detected (e.g., by the item/location detection engine 330).

In some embodiments, the wayfinding application 118 or the online concierge system 102 also may generate (e.g., via the interface engine 328) an augmented reality element 715 that recommends the replacement item and send (e.g., via the interface engine 328) the augmented reality element 715 for display to the user of the client device 110. In such embodiments, the augmented reality element 715 recommending the replacement item may include information associated with the replacement item (e.g., brand name, item type, size, nutritional information, price, discounts or coupons that may apply to the replacement item, etc.). Furthermore, in such embodiments, the augmented reality element 715 recommending the replacement item also may indicate a reason that the replacement item is being recommended. As shown in the example of FIG. 7C, an augmented reality element 715g indicates that the replacement item is being recommended because the target item is out of stock and includes information associated with the replacement item (i.e., the brand name and item type). In some embodiments, the user of the client device 110 may adjust one or more settings to change augmented reality elements 715 that recommend replacement items, such as types of information about the replacement items that are included in the augmented reality element 715 (e.g., unit price, item price, brand, etc.), criteria for recommending replacement items, etc. via the interface described above.

In some embodiments, if the wayfinding application 118 or the online concierge system 102 generates an augmented reality element 715 that includes a list of the target items, the wayfinding application 118 or the online concierge system 102 may update (e.g., using the interface engine 328) the augmented reality element 715. In such embodiments, the wayfinding application 118 or the online concierge system 102 may do so if a target item or a replacement item is unavailable, if a target item or a replacement item is collected, if a replacement item is identified, etc. For example, as shown in FIG. 7C, once the wayfinding application 118 or the online concierge system 102 determines 535 that the target item (i.e., Brand A refried beans) is not at the location within the warehouse 150 associated with the target item, it may update the shopping list included in augmented reality element 715b so that the target item is grayed out and includes a note indicating that the target item is not in stock. Furthermore, in the above example, once the replacement item (i.e., Brand E refried beans) is identified, the augmented reality element 715*b* is updated so that the shopping list includes the replacement item and a note indicating it is a replacement item. In the above example, the replacement item may not be added to the augmented reality element 715*b* until an input is received from the user of the client device 110 (e.g., via the interface described above) accepting the replacement item.

In some embodiments, once the replacement item is identified, the wayfinding application 118 or the online concierge system 102 may modify (e.g., using the route engine 324) the route 610 based on a location within the warehouse 150 associated with the replacement item (e.g., if the replacement item is not located near the target item). For example, once the replacement item is identified, the wayfinding application 118 or the online concierge system 102 may identify a location within the warehouse 150 associated with the replacement item based on the layout of the warehouse 150. In this example, the wayfinding application 118 or the online concierge system 102 may then modify the route 610 such that the modified route 610 is for navigating from the location associated with the target item to the location associated with the replacement item and the locations associated with any remaining target items. In embodiments in which the wayfinding application 118 or the online concierge system 102 modifies the route 610, the route 610 may be modified using the same techniques described above for identifying 515 the route 610 and information describing the modified route 610 may be stored (e.g., in the route database 326 in association with various types of information, as described above). In various embodiments, the route 610 may not be modified until an input is received from the user of the client device 110 (e.g., via the interface described above) accepting the replacement item. Furthermore, in embodiments in which the route 610 is modified, the wayfinding application 118 or the online concierge system 102 may generate (e.g., using the interface engine 328) a set of augmented reality elements 715 that include a set of instructions for navigating the modified route 610 within the warehouse 150. The wayfinding application 118 or the online concierge system 102 may then send (e.g., using the interface engine 328) the set of augmented reality elements 715 to the display area of the client device 110. Similarly, in embodiments in which the route 610 is modified and the wayfinding application 118 or the online concierge system 102 generates an augmented reality element 715 that includes the route 610, the wayfinding application 118 or the online concierge system 102 may update (e.g., using the interface engine 328) the augmented reality element 715. Once the augmented reality element 715 is updated to reflect the modified route 610 (e.g., with an icon representing the location associated with the replacement item and any remaining target items, etc.), it may be sent (e.g., using the interface engine 328) to the display area of the client device 110.

Referring again to FIG. 5, if the wayfinding application 118 or the online concierge system 102 determines 535 that the target item is at the location within the warehouse 150 associated with the target item (or elsewhere within the warehouse 150, in various embodiments), it may alert 555 the user of the client device 110 to the target item. It may do so by generating 560 (e.g., using the interface engine 328) an augmented reality element 715 that calls attention to the target item and sending 565 (e.g., using the interface engine 328) the augmented reality element 715 to the display area of the client device 110. Similar to the augmented reality elements 715 described above, the augmented reality element 715 may call attention to the target item by highlighting it (e.g., with one or more colors) or with icons (e.g., arrows or circles), animations, etc. Once the wayfinding application 118 or the online concierge system 102 alerts (540 or 555) the user of the client device 110 to the replacement item or the target item, one or more steps of the flowchart may be repeated (e.g., by proceeding back to step 530) for any remaining target items.

Figure 7D:
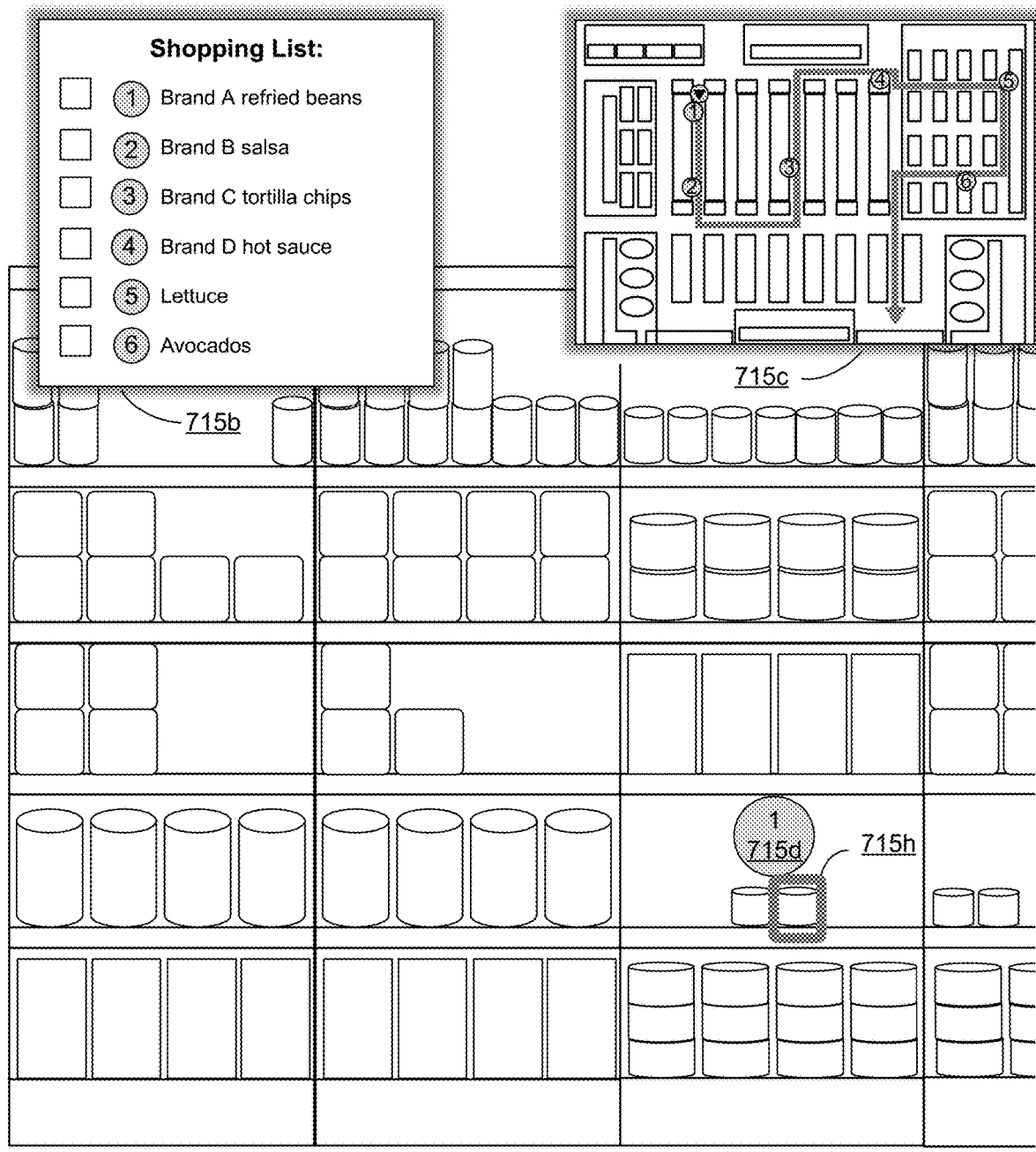
FIG. 7D illustrates a set of augmented reality elements that calls attention to an item within a warehouse, according to one or more embodiments.

An example of the augmented reality element 715 that calls attention to the target item is shown in FIG. 7D, which illustrates a set of augmented reality elements 715 that calls attention to an item within a warehouse 150, according to one or more embodiments, and continues the example described above in conjunction with FIGS. 6, 7A, and 7B. In the example of FIG. 7D, the augmented reality element 715*d* that calls attention to the location of the target item detected 530 within the display area of the client device 110 is an icon with a number (1) that corresponds to the number of the target item within the shopping list included in augmented reality element 715*b*. In this example, once sent to the display area of the client device 110, the augmented reality element 715*d* hovers next to a particular portion of the display area in which a shelf corresponding to the location associated with the target item is detected 530. In the above example, once the wayfinding application 118 or the online concierge system 102 determines 535 that the target item is at the location within the warehouse 150 associated with the target item, the wayfinding application 118 or the online concierge system 102 alerts 555 the user to the target item by generating 560 an additional augmented reality element 715*h* that calls attention to the target item and sending 565 the additional augmented reality element 715*h* to the display area of the client device 110. Continuing with this example, the augmented reality element 715*h* that calls attention to the target item is a halo that is overlaid onto a portion of the display area of the client device 110 at which the target item is detected (e.g., by the item/location detection engine 330).

In various embodiments, as the user of the client device 110 travels within the warehouse 150, the wayfinding application 118 or the online concierge system 102 may detect (e.g., using the item/location detection engine 330) that the user has deviated from the route 610. The wayfinding application 118 or the online concierge system 102 may do so based on the route 610, the layout of the warehouse 150, and image or video data captured by the camera of the client device 110. For example, the wayfinding application 118 or the online concierge system 102 may detect the location of the client device 110 within the warehouse 150 based on the layout of the warehouse 150 and physical elements detected within the display area of the client device 110. In this example, the wayfinding application 118 or the online concierge system 102 may detect that the user of the client device 110 has deviated from the route 610 if the detected location does not correspond to a location within the warehouse 150 along the route 610.

In embodiments in which the wayfinding application 118 or the online concierge system 102 detects that the user of the client device 110 has deviated from the route 610, the wayfinding application 118 or the online concierge system 102 may modify (e.g., using the route engine 324) the route 610 based on a current location of the client device 110 within the warehouse 150. For example, if the user of the client device 110 deviates from the route 610 after collecting some of the target items, the wayfinding application 118 or the online concierge system 102 may detect that the user has deviated from the route 610 and determine a current location of the client device 110. In this example, the wayfinding application 118 or the online concierge system 102 may then modify the route 610 based on the current location of the client device 110 within the warehouse 150 and the locations associated with the remaining target items. In this example, based on the modified route 610, the target items may be collected in an order that is different from that associated with the original route 610. In embodiments in which the route 610 is modified, the wayfinding application 118 or the online concierge system 102 may generate (e.g., using the interface engine 328) a set of augmented reality elements 715 including a set of instructions for navigating the modified route 610 within the warehouse 150 and send (e.g., using the interface engine 328) the set of augmented reality elements 715 to the display area of the client device 110.

In some embodiments, as the user of the client device 110 travels within the warehouse 150, the wayfinding application 118 or the online concierge system 102 also may detect (e.g., using the item/location detection engine 330) a quantity of an item at the warehouse 150. In such embodiments, the wayfinding application 118 or the online concierge system 102 may then update (e.g., using the inventory management engine 302) information describing the inventory of the item at the warehouse 150 (e.g., stored in the inventory database 304) to reflect the quantity of the item that was detected. Furthermore, in such embodiments, the wayfinding application 118 or the online concierge system 102 also or alternatively may update the layout of the warehouse 150 (e.g., stored in the layout database 322). In some embodiments, the layout of the warehouse 150 may be updated if at least a threshold quantity of an item is detected at the warehouse 150 and the wayfinding application 118 or the online concierge system 102 determines (e.g., using the item/location detection engine 330) that the threshold quantity of the item detected is not at a location within the warehouse 150 associated with the item. For example, suppose that the wayfinding application 118 or the online concierge system 102 detects at least ten cans of a particular brand and type of soup and determines that the cans of soup are not at a location within the warehouse 150 associated with the can of soup based on the layout of the warehouse 150. In this example, the wayfinding application 118 or the online concierge system 102 may update the layout of the warehouse 150 to reflect that the location within the warehouse 150 at which the cans of soup were detected is associated with the particular brand and type of soup.

Figure 7E:
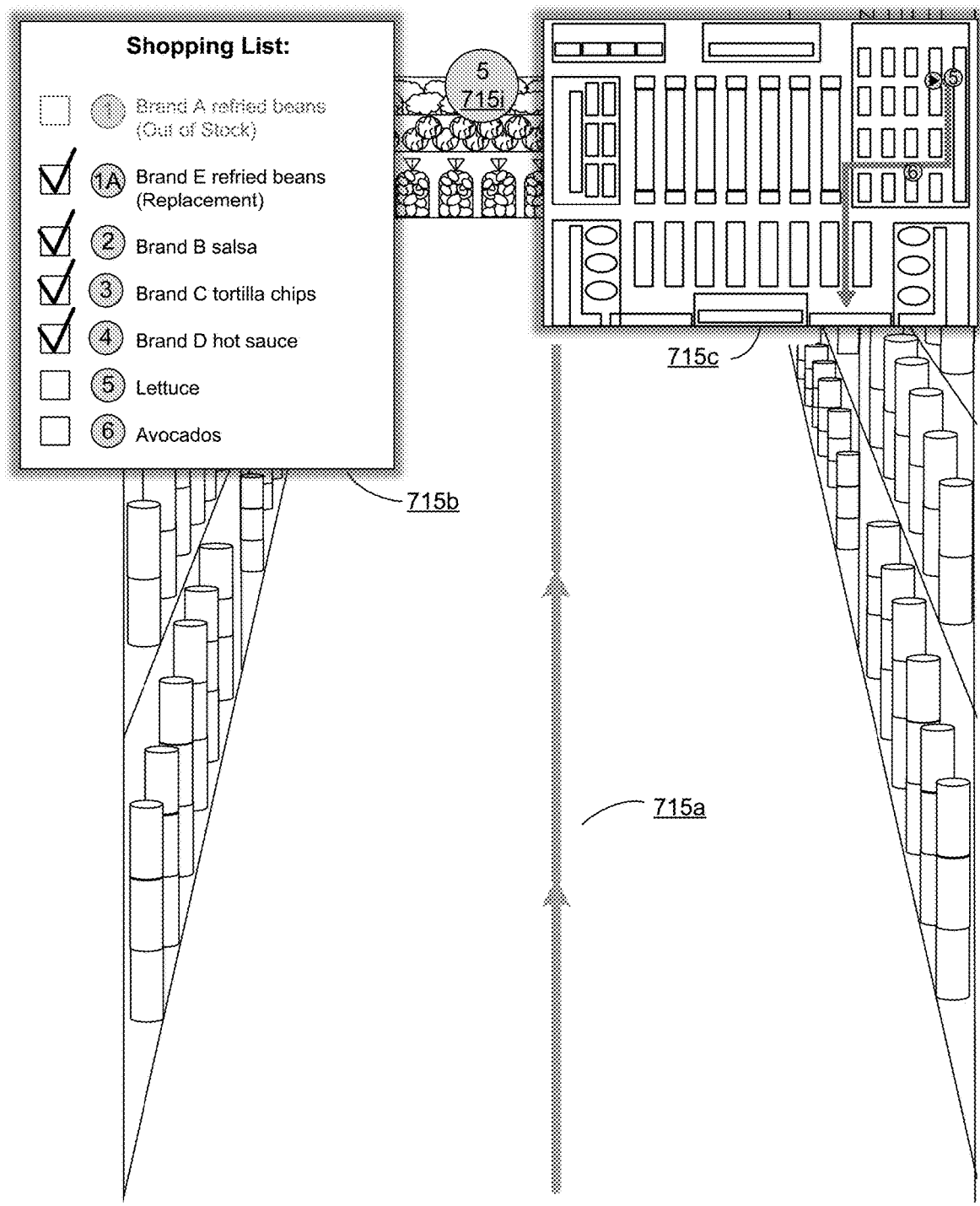
FIG. 7E illustrates a set of augmented reality elements for navigating a route within a warehouse to one or more locations associated with one or more items, according to one or more embodiments.

Furthermore, as the user of the client device 110 travels within the warehouse 150, an augmented reality element 715 that includes the list of target items may be updated (e.g., via the interface engine 328) and sent (e.g., via the interface engine 328) to the display area of the client device 110. As described above, the wayfinding application 118 or the online concierge system 102 may update an augmented reality element 715 that includes the list of target items if a target item is unavailable or if a replacement item is identified. In various embodiments, the augmented reality element 715 also may be updated if a replacement item is unavailable, if a target item or a replacement item is collected, etc. An example of this is shown in FIG. 7E, which illustrates a set of augmented reality elements 715 for navigating a route 610 within a warehouse 150 to one or more locations associated with one or more items, according to one or more embodiments, and continues the example described above in conjunction with FIGS. 6 and 7A-7C. In the example of FIG. 7E, as the target items and the replacement item in the shopping list included in augmented reality element 715b are collected, augmented reality element 715b is updated by checking a checkbox next to each collected item. In this example, the user of the client device 110 is approaching an augmented reality element 715i that calls attention to a location of the fifth target item detected 530 within the display area of the client device 110, which is an icon with a number (5) that corresponds to the number of the target item within the shopping list included in augmented reality element 715b. Continuing with this example, checkboxes next to the fifth and sixth target items within the shopping list included in augmented reality element 715b have not been checked because they have not yet been collected by the user of the client device 110.

In embodiments in which an augmented reality element 715 that includes the list of target item(s) is updated, the augmented reality element 715 may be updated upon detecting (e.g., using the item/location detection engine 330) that an item has been collected or in response to receiving an input from the user via the interface described above. For example, if the wayfinding application 118 or the online concierge system 102 detects a target item and a shopping basket being held by the user of the client device 110, the wayfinding application 118 or the online concierge system 102 also may detect that the target item is within the shopping basket. In this example, an augmented reality element 715 that includes the target item in a shopping list may be updated by checking a checkbox next to the target item. As an additional example, as the replacement item and target items in the shopping list included in augmented reality element 715b shown in FIG. 7E are collected, the wayfinding application 118 or the online concierge system 102 may receive requests from the user of the client device 110 to check the collected items off the list via the interface described above. In this example, augmented reality element 715b may be updated in response to each request by checking off the collected item.

In embodiments in which the wayfinding application 118 or the online concierge system 102 generates an augmented reality element 715 that includes the route 610, the augmented reality element 715 also may be updated (e.g., as the user of the client device 110 moves within the warehouse 150, as the target item(s) is/are collected, as the route 610 is modified, etc.). In the examples of FIGS. 7A-7E, as the user of the client device 110 moves along the route 610, the icon representing the location of the client device 110 also moves, tracking the location of the client device 110 within the warehouse 150. In this example, as the target items are collected, icons representing the locations associated with the target items are removed.

In some embodiments, the wayfinding application 118 or the online concierge system 102 also may generate (e.g., using the interface engine 328) one or more augmented reality elements 715 configured to perform various functions, which is/are then sent (e.g., using the interface engine 328) to the display area of the client device 110. In such embodiments, the augmented reality element(s) 715 may be configured to perform the functions with respect to items included among the inventory of the warehouse 150 detected within the display area of the client device 110, including calling attention to them and/or their attributes, obscuring them, comparing them, recommending different items, and promoting them. In some embodiments, augmented reality elements 715 also or alternatively may be configured to perform the same functions with respect to other physical elements (e.g., advertisements, coupons, etc.) detected (e.g., by the item/location detection engine 330) within the display area of the client device 110. In various embodiments, the user of the client device 110 may adjust one or more settings to change an augmented reality element 715 (e.g., its appearance, how it performs a function, etc.) via the interface described above.

The additional augmented reality element(s) 715 may be configured to perform different functions for various reasons. In addition to calling attention to target items and replacement items detected within the display area of the client device 110, an augmented reality element 715 also may call attention to an item detected within the display area of the client device 110 if one or more attributes of the item match profile information associated with the customer 204. An augmented reality element 715 may call attention to an attribute of an item detected within the display area of the client device 110 if the item having the attribute is a target item, if the attribute matches the profile information associated with the customer 204, etc. An augmented reality element 715 may obscure an item detected within the display area of the client device 110 if the profile information associated with the customer 204 indicates that the customer 204 dislikes the item/attributes of the item, if the profile information indicates the customer 204 has a restriction, such as a dietary restriction, associated with the item, etc. An augmented reality element 715 may compare two or more items detected within the display area of the client device 110 if the user of the client device 110 is holding the items, if the items are detected within the display area for at least a threshold amount of time, etc. In addition to recommending a replacement item for a target item that is out of stock, an augmented reality element 715 may recommend an item detected within the display area of the client device 110 if the customer 204 is likely to purchase it (e.g., based on their order/purchase history or other profile information, other items included among the target item(s) etc.), if it is a replacement item the customer 204 is likely to prefer to a target item, etc. An augmented reality element 715 may promote an item detected within the display area of the client device 110 if it is a new item, if the customer 204 is considering purchasing it, if it is on sale or associated with a promotion, etc.

In embodiments in which the wayfinding application 118 or the online concierge system 102 generates the augmented reality element(s) 715 configured to perform one or more of the functions described above, the augmented reality element(s) 715 may be generated based on various types of information. Examples of such information include inferences made by the wayfinding application 118 or the online concierge system 102 (e.g., using the experience enhancement engine 338) and information describing replacement items identified by the wayfinding application 118 or the online concierge system 102 (e.g., using the item replacement engine 332 and the experience enhancement engine 338). For example, if the wayfinding application 118 or the online concierge system 102 detects that the user of the client device 110 is holding two items, it may infer that the user is comparing the items and may generate an augmented reality element 715 that compares various attributes of the items (e.g., their sugar contents, calorie counts, etc.). Additional examples of information that the wayfinding application 118 or the online concierge system 102 may use to generate the additional augmented reality element(s) 715 include information describing profile or other information associated with the customer 204 that the wayfinding application 118 or the online concierge system 102 matches (e.g., using the experience enhancement engine 338) with attributes of items and information accessed from various databases (e.g., the inventory database 304, the customer database 314, the content database 334, etc.). For example, if the profile information associated with the customer 204 indicates that the customer 204 is on a low-sugar diet, the wayfinding application 118 or the online concierge system 102 may match this information with an attribute of an item the user of the client device 110 is holding corresponding to its low sugar content. In this example, based on the information describing the match, an augmented reality element 715 generated by the wayfinding application 118 or the online concierge system 102 calling attention to an attribute of the item may highlight its sugar content.

In some embodiments, the wayfinding application 118 or the online concierge system 102 may store information describing augmented reality elements 715 sent to the client device 110 (e.g., in the customer database 314), such that this information is included among the profile information associated with the customer 204. For example, suppose that the wayfinding application 118 or the online concierge system 102 sends an augmented reality element 715 to the display area of the client device 110, in which the augmented reality element 715 promotes an item and includes a content item (e.g., a coupon) associated with the item. In this example, information describing the augmented reality element 715 (e.g., information indicating that it promoted the item, information identifying the item and the content item, etc.) and a date and time that it was sent to the display area of the client device 110 may be stored among the profile information associated with the customer 204.

Additional Considerations

The foregoing description of the embodiments of the invention has been presented for the purpose of illustration; it is not intended to be exhaustive or to limit the invention to the precise forms disclosed. Many modifications and variations are possible in light of the above disclosure.

Some portions of this description describe the embodiments of the invention in terms of algorithms and symbolic representations of operations on information. These algorithmic descriptions and representations are commonly used in the data processing arts to convey the substance of their work effectively to others. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, at a wayfinding application executing on a client device, a current location of the client device within a warehouse, wherein the warehouse is associated with a retailer and a plurality of items included among an inventory of the warehouse;
   accessing, from a layout database by a route engine, a layout of the warehouse, wherein the layout of the warehouse describes a set of locations within the warehouse associated with each item of the plurality of items;
   identifying, by the route engine, a route for navigating from the current location of the client device to one or more locations within the warehouse associated with one or more of the plurality of items based at least in part on the current location of the client device and the layout of the warehouse;
   generating, by an interface engine, a set of augmented reality elements comprising a set of instructions for navigating the identified route within the warehouse;
   sending, by the interface engine, the set of augmented reality elements to a display area of the client device wherein the sending causes the client device to overlay the augmented reality elements onto portions of the display area of the client device;
   detecting, by a detection engine, a location within the warehouse associated with a target item of the plurality of items wherein the detecting comprises detecting physical elements within the display area of the client device;
   determining, by the detection engine, whether the target item is at the location within the warehouse associated with the target item based at least in part on an image captured by the client device;
   determining, by the detection engine, that the target item is not at the location within the warehouse associated with the target item; and
   alerting a user of the client device to a replacement item by:
      generating, by the interface engine, an augmented reality element that calls attention to the replacement item, and
      sending, by the interface engine, the augmented reality element to the display area of the client device.

2. The method of claim 1, wherein alerting the user of the client device to the replacement item further comprises:
   capturing, at the client device, one or more of an additional image and a video of a set of additional items, wherein each additional item of the set of additional items have at least a threshold measure of similarity to the target item;
   communicating a set of information identifying each additional item of the set of additional items to an additional client device associated with a customer associated with an online concierge system; and
   receiving information identifying the replacement item from the additional client device associated with the customer, wherein the replacement item is included among the set of additional items.

3. The method of claim 1, wherein alerting the user of the client device to the replacement item further comprises:
   accessing a first set of attributes of the target item and a plurality of sets of attributes of the plurality of items included among the inventory of the warehouse;
   identifying the replacement item based at least in part on the first set of attributes of the target item and a second set of attributes of the replacement item, wherein the first set of attributes of the target item has at least a threshold measure of similarity to the second set of attributes of the replacement item;
   modifying the route based at least in part on an additional location within the warehouse associated with the replacement item;
   generating an additional set of augmented reality elements comprising an additional set of instructions for navigating the modified route within the warehouse; and
   sending the additional set of augmented reality elements to the display area of the client device.

4. The method of claim 3, wherein identifying the replacement item is further based at least in part on a set of preferences associated with a customer associated with an online concierge system.

5. The method of claim 3, wherein identifying the replacement item is further based at least in part on an order history associated with a customer associated with an online concierge system.

6. The method of claim 1, further comprising:
   detecting, within the display area of the client device, a quantity of an additional item within the warehouse; and
   updating the inventory of the warehouse based at least in part on the detected quantity of the additional item.

7. The method of claim 1, further comprising:
   generating an additional augmented reality element comprising the route for navigating from the current location of the client device to the one or more locations within the warehouse associated with the one or more of the plurality of items; and
   sending the additional augmented reality element to the display area of the client device.

8. The method of claim 1, further comprising:
   generating an additional augmented reality element comprising a list of the one or more of the plurality of items; and
   sending the additional augmented reality element to the display area of the client device.

9. The method of claim 1, further comprising:
   determining the target item is at the location within the warehouse associated with the target item; and
   alerting the user of the client device to the target item by:
      generating an additional augmented reality element that calls attention to the target item, and
      sending the additional augmented reality element to the display area of the client device.

10. A computer program product comprising a non-transitory computer readable storage medium having instructions encoded thereon that, when executed by a processor, cause the processor to:
   receive, at a wayfinding application executing on a client device, a current location of the client device within a warehouse, wherein the warehouse is associated with a retailer and a plurality of items included among an inventory of the warehouse;
   access, from a layout database by a route engine, a layout of the warehouse, wherein the layout of the warehouse describes a set of locations within the warehouse associated with each item of the plurality of items;
   identify, by the route engine, a route for navigating from the current location of the client device to one or more locations within the warehouse associated with one or more of the plurality of items based at least in part on the current location of the client device and the layout of the warehouse;
   generate, by an interface engine, a set of augmented reality elements comprising a set of instructions for navigating the identified route within the warehouse;
   send, by the interface engine, the set of augmented reality elements to a display area of the client device wherein the sending causes the client device to overlay the augmented reality elements onto portions of the display area of the client device;
   detect, by a detection engine, a location within the warehouse associated with a target item of the plurality of items;
   determine, by the detection engine, whether the target item is at the location within the warehouse associated with the target item based at least in part on an image captured by the client device;
   determine, by the detection engine, that the target item is not at the location within the warehouse associated with the target item; and
   alert a user of the client device to a replacement item by:
      generating, by the interface engine, an augmented reality element that calls attention to the replacement item, and
      sending, by the interface engine, the augmented reality element to the display area of the client device.

11. The computer program product of claim 10, wherein alert the user of the client device to the replacement item further comprises:
   capture, at the client device, one or more of an additional image and a video of a set of additional items, wherein each additional item of the set of additional items have at least a threshold measure of similarity to the target item;
   communicate a set of information identifying each additional item of the set of additional items to an additional client device associated with a customer associated with an online concierge system; and
   receive information identifying the replacement item from the additional client device associated with the customer, wherein the replacement item is included among the set of additional items.

12. The computer program product of claim 10, wherein alert the user of the client device to the replacement item further comprises:
   access a first set of attributes of the target item and a plurality of sets of attributes of the plurality of items included among the inventory of the warehouse;
   identify the replacement item based at least in part on the first set of attributes of the target item and a second set of attributes of the replacement item, wherein the first set of attributes of the target item has at least a threshold measure of similarity to the second set of attributes of the replacement item;
   modify the route based at least in part on an additional location within the warehouse associated with the replacement item;
   generate an additional set of augmented reality elements comprising an additional set of instructions for navigating the modified route within the warehouse; and
   send the additional set of augmented reality elements to the display area of the client device.

13. The computer program product of claim 12, wherein identify the replacement item is further based at least in part on a set of preferences associated with a customer associated with an online concierge system.

14. The computer program product of claim 12, wherein identify the replacement item is further based at least in part on an order history associated with a customer associated with an online concierge system.

15. The computer program product of claim 10, wherein the computer-readable storage medium further has instructions encoded thereon that, when executed by the processor, cause the processor to:
   detect, within the display area of the client device, a quantity of an additional item within the warehouse; and
   update the inventory of the warehouse based at least in part on the detected quantity of the additional item.

16. The computer program product of claim 10, wherein the computer-readable storage medium further has instructions encoded thereon that, when executed by the processor, cause the processor to:
   generate an additional augmented reality element comprising the route for navigating from the current location of the client device to the one or more locations within the warehouse associated with the one or more of the plurality of items; and
   send the additional augmented reality element to the display area of the client device.

17. The computer program product of claim 10, wherein the computer-readable storage medium further has instructions encoded thereon that, when executed by the processor, cause the processor to:
   generate an additional augmented reality element comprising a list of the one or more of the plurality of items; and
   send the additional augmented reality element to the display area of the client device.

18. The computer program product of claim 10, wherein the computer-readable storage medium further has instructions encoded thereon that, when executed by the processor, cause the processor to:
   determine the target item is at the location within the warehouse associated with the target item; and
   alert the user of the client device to the target item by:
      generating an additional augmented reality element that calls attention to the target item, and sending the additional augmented reality element to the display area of the client device.

19. A computer system comprising:
a processor; and
a non-transitory computer readable storage medium storing instructions that, when executed by the processor, cause the computer system to perform actions comprising:
- receiving, at a wayfinding application executing on a client device, a current location of the client device within a warehouse, wherein the warehouse is associated with a retailer and a plurality of items included among an inventory of the warehouse;
- accessing, from a layout database by a route engine, a layout of the warehouse, wherein the layout of the warehouse describes a set of locations within the warehouse associated with each item of the plurality of items;
- identifying, by the route engine, a route for navigating from the current location of the client device to one or more locations within the warehouse associated with one or more of the plurality of items based at least in part on the current location of the client device and the layout of the warehouse;
- generating, by an interface engine, a set of augmented reality elements comprising a set of instructions for navigating the identified route within the warehouse;
- sending, by the interface engine, the set of augmented reality elements to a display area of the client device wherein the sending causes the client device to overlay the augmented reality elements onto portions of the display area of the client device;
- detecting, by a detection engine, a location within the warehouse associated with a target item of the plurality of items;
- determining, by the detection engine, whether the target item is at the location within the warehouse associated with the target item based at least in part on an image captured by the client device;
- determining, by the detection engine, that the target item is not at the location within the warehouse associated with the target item; and
- alerting a user of the client device to a replacement item by:
  - generating, by the interface engine, an augmented reality element that calls attention to the replacement item, and
  - sending, by the interface engine, the augmented reality element to the display area of the client device.

20. The computer system of claim 19, wherein alerting the user of the client device to the replacement item further comprises:
- capturing, at the client device, one or more of an additional image and a video of a set of additional items, wherein each additional item of the set of additional items have at least a threshold measure of similarity to the target item;
- communicating a set of information identifying each additional item of the set of additional items to an additional client device associated with a customer associated with an online concierge system; and
- receiving information identifying the replacement item from the additional client device associated with the customer, wherein the replacement item is included among the set of additional items.

* * * * *